US012597678B2

(12) United States Patent
Jeong et al.

(10) Patent No.: US 12,597,678 B2
(45) Date of Patent: Apr. 7, 2026

(54) UNIT CELL AND BATTERY CELL COMPRISING THE SAME

(71) Applicant: LG Energy Solution, Ltd., Seoul (KR)

(72) Inventors: Hyeok Jeong, Daejeon (KR); Seong Won Choi, Daejeon (KR); Yong Jun Lee, Daejeon (KR); Su Taek Jung, Daejeon (KR); Soon Kwan Kwon, Daejeon (KR); Sangho Bae, Daejeon (KR); Minwook Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 990 days.

(21) Appl. No.: 17/750,835

(22) Filed: May 23, 2022

(65) Prior Publication Data

US 2022/0416363 A1 Dec. 29, 2022

(30) Foreign Application Priority Data

Jun. 11, 2021 (KR) ........................ 10-2021-0076219
Jun. 11, 2021 (KR) ........................ 10-2021-0076220
Apr. 19, 2022 (KR) ........................ 10-2022-0048385

(51) Int. Cl.
*H01M 50/46* (2021.01)
*C08F 220/14* (2006.01)
(Continued)

(52) U.S. Cl.
CPC ......... *H01M 50/461* (2021.01); *C08F 220/14* (2013.01); *C09J 11/08* (2013.01);
(Continued)

(58) Field of Classification Search
None
See application file for complete search history.

(56) References Cited

U.S. PATENT DOCUMENTS 9,290,682 B2 3/2016 Chen et al.
10,160,891 B2 12/2018 Dodge et al.
(Continued)

FOREIGN PATENT DOCUMENTS

CN 108587534 A * 9/2018 ................ C09J 7/30
EP 3605650 A1 2/2020
(Continued)

OTHER PUBLICATIONS

Extended European Search Report including Written Opinion for Application No. 22820406.1 dated Feb. 14, 2025. 13 pages.
(Continued)

*Primary Examiner* — Eli D. Strah
(74) *Attorney, Agent, or Firm* — Lerner David LLP

(57) ABSTRACT

A unit cell includes a separator and an electrode, which are alternately laminated by a predetermined number. The unit cell is configured such that: the unit cell is laminated in the order of a lower separator, any one electrode of an anode or a cathode, an upper separator, and the other one electrode of the anode or the cathode, wherein at least one surface of the electrode and the separator is applied with an adhesive to adhere the electrode and the separator or the lower separator and the upper separator. The adhesive contains an adhesive composition comprising a copolymer and a rosin ester-based additive, the copolymer contains 60.1 to 79.9% by weight of two or more kinds of alkyl (meth)acrylate-based repeating units (A), and 20.1 to 39.9% by weight of (meth)acrylate-based repeating unit (B) having a hydroxyl group at its end.

23 Claims, 15 Drawing Sheets

(51) Int. Cl.

| | |
|---|---|
| ***C09J 11/08*** | (2006.01) |
| ***C09J 133/06*** | (2006.01) |
| ***C09J 133/12*** | (2006.01) |
| ***H01M 10/04*** | (2006.01) |
| ***H01M 50/466*** | (2021.01) |
| *C08J 5/12* | (2006.01) |
| *H01M 10/0583* | (2010.01) |

(52) U.S. Cl.

CPC ......... *C09J 133/066* (2013.01); *C09J 133/12* (2013.01); *H01M 10/0459* (2013.01); *H01M 50/466* (2021.01); *C08J 5/12* (2013.01); *H01M 10/0583* (2013.01); *Y02E 60/10* (2013.01); *Y02P 70/50* (2015.11)

(56) References Cited

U.S. PATENT DOCUMENTS

| | | | | |
|---|---|---|---|---|
| 10,167,416 | B2 | 1/2019 | Clay et al. | |
| 2005/0100794 | A1 | 5/2005 | Chamberlain et al. | |
| 2008/0274394 | A1 | 11/2008 | Schormann et al. | |
| 2011/0111660 | A1 | 5/2011 | Morino et al. | |
| 2011/0269012 | A1 | 11/2011 | Perner et al. | |
| 2013/0071740 | A1 | 3/2013 | Takamura et al. | |
| 2013/0202885 | A1* | 8/2013 | Dodge | C09J 123/0869 525/221 |
| 2014/0227603 | A1 | 8/2014 | Ogata | |
| 2015/0376474 | A1 | 12/2015 | Hong et al. | |
| 2016/0049628 | A1 | 2/2016 | Kim et al. | |
| 2018/0316045 | A1* | 11/2018 | Kawabe | H01M 50/489 |
| 2019/0044177 | A1* | 2/2019 | Lee | H01M 10/0459 |
| 2019/0127594 | A1 | 5/2019 | Clay et al. | |
| 2021/0147721 | A1 | 5/2021 | Kang et al. | |
| 2021/0184242 | A1 | 6/2021 | Lee et al. | |
| 2021/0280844 | A1 | 9/2021 | Ohta et al. | |

FOREIGN PATENT DOCUMENTS

| | | | | |
|---|---|---|---|---|
| EP | 3951972 | A1 | 2/2022 | |
| JP | 2009508298 | A | 2/2009 | |
| JP | 2010514112 | A | 4/2010 | |
| JP | 2010265483 | A | 11/2010 | |
| JP | 2014108968 | A | 6/2014 | |
| JP | 2015041603 | A | 3/2015 | |
| JP | 2017095698 | A | 6/2017 | |
| JP | 6883973 | B2 | 6/2021 | |
| KR | 20080062642 | A | 7/2008 | |
| KR | 101295509 | B1 | 8/2013 | |
| KR | 20140070374 | A | 6/2014 | |
| KR | 20140092906 | A | 7/2014 | |
| KR | 20150058069 | A | 5/2015 | |
| KR | 101616721 | B1 | 4/2016 | |
| KR | 20160146825 | A | 12/2016 | |
| KR | 20170023605 | A | 3/2017 | |
| KR | 101740247 | B1 | 5/2017 | |
| KR | 101811328 | B1 | 12/2017 | |
| KR | 101852656 | B1 | 4/2018 | |
| KR | 101933950 | B1 | 1/2019 | |
| KR | 20190099941 | A | 8/2019 | |
| KR | 20190134646 | A | 12/2019 | |
| KR | 20200057978 | A | 5/2020 | |
| KR | 20200107602 | A * | 9/2020 | H01M 10/446 |
| KR | 102255560 | B1 | 5/2021 | |
| KR | 20210073451 | A | 6/2021 | |

OTHER PUBLICATIONS

Ding, Y. et al., "Supplementary Information file for Which is a Better Fluorescent Sensor: Aggregation-Induced Emission-Based Nanofibers or Thin-Coating Films?", Material Advances, Jul. 2020, 13 pages.

Kim, G.H. et al., "Copolymerization of Butyl Acrylate (BA)/Methyl Methacrylate (MMA) and Thermal, Mechanical Properties of Poly(lactic acid)/Acrylic Copolymer Blends", Polymer(Korea), Jun. 2016, pp. 786-796, vol. 40, No. 5. [Providing English Translation of Abstract only].

Seo, Y. et al., "Preparation and Characterization of Removal-type Acrylic Pressure-Sensitive Adhesive", Elastomer, Feb. 2001, pp. 225-236, vol. 36, No. 4. [Providing English Translation of Abstract only].

* cited by examiner

UNIT CELL AND BATTERY CELL COMPRISING THE SAME

CROSS-REFERENCE TO RELATED APPLICATIONS

This application claims the benefit of the filing dates of Korean Patent Application No. 10-2021-0076219 filed Jun. 11, 2021, Korean Patent Application No. 10-2021-0076220 filed Jun. 11, 2021, and Korean Patent Application No. 10-2022-0048385 filed Apr. 19, 2022, the disclosures of which are hereby incorporated herein by reference.

TECHNICAL FIELD

The present disclosure relates to a unit cell and a battery cell including the same, and more particularly to a unit cell and a battery cell including the same including an adhesive composition that can be used in the manufacture of an electrode assembly for a secondary battery.

BACKGROUND ART

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, being freely charged and discharged, and having very low self-discharge rate and high energy density.

Such lithium secondary battery mainly uses a lithium-based oxide and a carbonaceous material as a cathode active material and an anode active material, respectively. The lithium secondary battery includes an electrode assembly in which a cathode plate and an anode plate respectively applied with the cathode active material and the anode active material are disposed with a separator being interposed between them, and an exterior material, that is, a battery case, that seals and houses the electrode assembly together with an electrolyte solution.

Based on the shape of a battery case, the secondary battery is classified into a cylindrical battery where an electrode assembly is mounted in a cylindrical metal can, a prismatic battery where an electrode assembly is mounted in a prismatic metal can, and a pouch-type battery where an electrode assembly is mounted in a pouch type case formed of an aluminum laminate sheet.

Meanwhile, the electrode assembly is manufactured by various methods, but it is generally manufactured by preparing unit cells 4 in advance and then laminating a plurality of the unit cells 4.

FIG. 1 is a simplified diagram showing a state in which a unit cell is manufactured according to a conventional method.

Referring to FIG. 1, the conventional manufacturing method for manufacturing the unit cells 4 is configured such that from the top, a cathode 1, a separator 3 that is relatively laminated on the top, an anode 2, and a separator 3 that is relatively laminated on the bottom are continuously unwound and supplied in a state of being wound in a roll shape.

At this time, the separators 3 are continuously supplied without breakage, the anode 2 is supplied between the separators 3, and the cathode 1 is supplied on the upper separator 3, but they are cut to a predetermined size and introduced at regular intervals. At this time, the input timing is controlled so that the cathode 2 and the anode 1 are laminated up and down in correspondence with each other. Therefore, the separators 3 are continuously connected, but the anode 2 and the cathode 1 are continuously passed through a laminating device while being spaced apart from the adjacent anode 2 and the cathode 1 at a predetermined distance.

While passing through the laminating device, heating is performed between the cathode 1, the separator 3, and the anode 2, and pressing is performed by a nip roller 5. That is, lamination (adhesion) is performed by heating and pressing, and then the separators 3 are cut and manufactured into individual unit cells 4.

However, in the conventional method as described above, the electrodes (anode and cathode) could be pushed off or damaged in their original positions or damaged while heat and pressure are applied, and if heating is not performed evenly, there is a problem that a difference in adhesive force between the electrodes 1 and 2 and the separator 3 may be generated.

DETAILED DESCRIPTION OF THE INVENTION

Technical Problem

It is an object of the present disclosure to provide a unit cell and a battery cell including the same including an adhesive composition that can eliminate the difference in adhesive force between the electrode and the separator contained in the electrode assembly and reduce the defective rate of the final battery cell.

However, the technical problem to be solved by embodiments of the present disclosure is not limited to the above-described problems, and can be variously expanded within the scope of the technical idea included in the present disclosure.

Technical Solution

According to another embodiment of the present disclosure, there is provided a unit cell in which a separator and an electrode are alternately laminated by a predetermined number, the unit cell being configured such that: the unit cell is laminated in the order of a lower separator, any one electrode of an anode or a cathode, an upper separator, and the other one electrode of the anode or the cathode, at least one surface of the electrode and the separator is applied with an adhesive to adhere the electrode and the separator or the lower separator and the upper separator; the adhesive comprises an adhesive composition comprising a copolymer and a rosin ester-based additive, the copolymer contains 60.1 to 79.9% by weight of two or more kinds of alkyl (meth)acrylate-based repeating units (A), and 20.1 to 39.9% by weight of (meth)acrylate-based repeating unit (B) having a hydroxyl group at its end, and the adhesive composition contains 30% by weight to 70% by weight of the copolymer and 30% by weight to 70% by weight of the additive.

In another embodiment, a method for manufacturing a unit cell in which a separator and an electrode are alternately laminated by a predetermined number is provided. The method includes:

applying an adhesive to at least one surface of the electrode or the separator to adhere the electrode and the separator or a lower separator and an upper separator; laminating the unit cell in the order of the lower separator, a first electrode, the upper separator and a second electrode; wherein the adhesive comprises an adhesive composition comprising a copolymer and a rosin ester-based additive, the copolymer contains 60.1 to 79.9% by weight of two or more kinds of alkyl (meth)acrylate-based repeating units (A), and 20.1 to 39.9% by weight of (meth)acrylate-based repeating unit (B) having a hydroxyl group at its end, and the adhesive composition contains 30% by weight to 70% by weight of the copolymer and 30% by weight to 70% by weight of the additive.

The adhesive may be applied to one surface of the upper separator or the lower separator to adhere the upper separator and the lower separator.

The adhesive may be applied to one surface of the separator or the electrode to adhere the separator and the electrode facing each other.

The repeating unit (A) may be represented by the following Chemical Formula 1, and the repeating unit (B) may be represented by the following Chemical Formula 2.

[Chemical Formula 1]

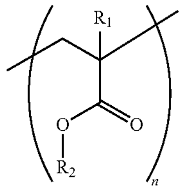

wherein in Chemical Formula 1, $R_1$ is a hydrogen atom or a methyl group, $R_2$ is a straight-chain or side-chain alkyl group having 1 to 12 carbon atoms, and n indicates the number of repetitions of the repeating unit (A) and is an integer of 450 to 850.

[Chemical Formula 2]

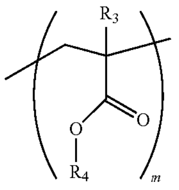

wherein in Chemical Formula 2, $R_3$ is a hydrogen atom or a methyl group, $R_4$ is a straight-chain or side-chain alkyl group having 1 to 9 carbon atoms to which a hydroxyl group is bonded, and m indicates the number of repetitions of the repeating unit (B) and is an integer of 200 to 350.

A weight average molecular weight (Mw) of the copolymer may be 120000 to 140000.

One of the two or more kinds of repeating units (A) may include an acrylate-based repeating unit, at least the other one may be a methacrylate-based repeating unit, and an alkyl group having a greater number of carbon atoms than the end of the methacrylate-based repeating unit may be bonded to the end of the acrylate-based repeating unit.

A straight-chain or side-chain alkyl group having 4 to 12 carbon atoms may be bonded to the end of the acrylate-based repeating unit, and an alkyl group having 1 to 3 carbon atoms may be bonded to the end of the methacrylate-based repeating unit.

Both of the two or more kinds of repeating units (A) may be acrylate-based repeating units, and at least one of the two or more kinds of repeating units (A) may be an isobornyl acrylate-based repeating unit.

The two or more kinds of repeating units (A) may include a methyl methacrylate-based repeating unit and a 2-ethylhexyl acrylate (2-EHA)-based repeating unit.

The repeating unit (B) may include a 2-hydroxyethyl acrylate (2-HEA)-based repeating unit.

A glass transition temperature (Tg)(° C.) of the additive may be −10 or less.

HSP (Hilderbrand solubility) of the additive may have a value of 19 to 22 $(MPa)^{0.5}$.

The adhesive composition may contain 30% by weight to 70% by weight of the copolymer and 30% by weight to 70% by weight of the additive.

The adhesive composition may contain 30% by weight to 50% by weight of the copolymer and 50% by weight to 70% by weight of the additive.

A glass transition temperature (Tg)(° C.) of the additive composition may be −40 or less.

A glass transition temperature (Tg)(° C.) of the additive composition may be −50 or less.

The adhesive composition may have a viscosity of 2200 cPs to 2500 cPs at 80° C.

The adhesive composition may have a viscosity of 2200 cPs to 2400 cPs at 80° C.

Dots formed by discharging the adhesive composition from a dispenser at the first time point have a first diameter value, and dots formed by discharging the adhesive composition from the dispenser at a second time point which is 30 minutes or more after the first time point have a second diameter value, a deviation between the first diameter and the second diameter may be within 5%, and a temperature of the dispenser may be 120° C.

An adhesive force of the adhesive composition may be 40 $gf/mm^2$ or more.

An adhesive force of the adhesive composition may be 85 to 92 $gf/mm^2$ or more.

According to another embodiment of the present disclosure, there is provided an electrode assembly formed by alternately stacking the unit cell, the electrode assembly being configured such that: the adhesive for adhering the electrode and the separator includes an adhesive pattern disposed at the same position between the electrode and the separator.

According to another embodiment of the present disclosure, there is provided an electrode assembly formed by alternately stacking the unit cell, the electrode assembly being configured such that: the adhesive for adhering the electrode and the separator includes an adhesive pattern disposed at a staggered form between the electrode and the separator.

According to yet another embodiment of the present disclosure, there is provided a battery cell comprising the above-mentioned unit cell.

The battery cell may have a zigzag shape by folding the separator.

Advantageous Effects

According to the embodiments, an adhesive composition is provided between the electrode and the separator or between the two separators during the manufacturing process of the electrode assembly, whereby heat and pressure applied when laminating between the electrode and the separator can be minimized and misalignment between the separator and the electrode can be prevented, thus preventing deformation and breakage of the electrode and the separator.

The effects of the present disclosure are not limited to the effects mentioned above and additional other effects not described in the above will be clearly understood from the description of the appended claims by those skilled in the art.

DETAILED DESCRIPTION OF THE EMBODIMENTS

Figure 1:
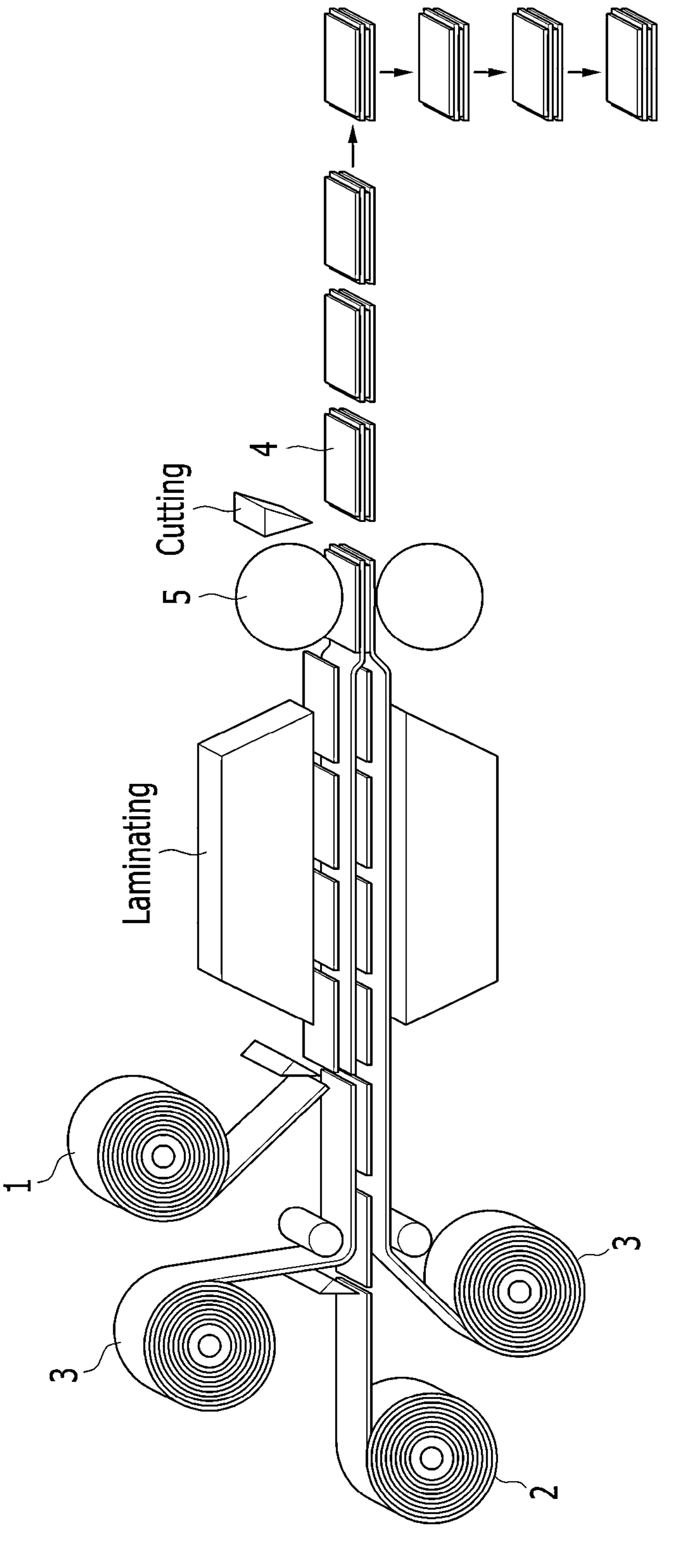
FIG. 1 is a simplified diagram showing a state in which a unit cell is manufactured according to a conventional method.

Hereinafter, various embodiments of the present disclosure will be described in detail with reference to the accompanying drawings so that those skilled in the art can easily implement them. The disclosed embodiments may be modified in various different ways, without departing from the spirit or scope of the present disclosure, and the scope of the present disclosure is not limited to the embodiments set forth herein.

The present disclosure relates to an adhesive composition.

In the present disclosure, the "adhesive composition" may mean a composition that can function as an adhesive before or after crosslinking or curing. In the above, the definition of the adhesive follows the definition known in the art.

In the present disclosure, the "adhesive (co)polymer" means a polymer whose physical properties such as glass transition temperature are adjusted so that adhesive performance can be exhibited before and/or after crosslinking or curing. The composition of the polymer is well known in the art.

The adhesive composition may include an adhesive (co) polymer. When the composition is in a state of a solution containing water, an organic solvent or the like, the ratio of the adhesive (co)polymer may be based on the weight of the solid content excluding the solvent and the like.

In the present disclosure, the "acrylic (co)polymer" is a polymer containing a polymerization unit or a repeating unit of one or more acrylic monomer as a main component. In the present disclosure, the polymerization unit or the repeating unit of a certain monomer means an unit structure included in a (co)polymer through the polymerization reaction derived from the monomer.

In the present disclosure, by "a certain component B contains another component A as a main component" is meant herein a case where the ratio of the component A in the component B is about 55% by weight or more, 60% by weight or more, 65% by weight or more, 70% by weight or more, 75% by weight or more, 80% or more, 85% or more, or 90% or more, based on the total weight of B. The upper limit of the ratio is not particularly limited, and may be, for example, about 98% by weight or less or 95% by weight or less.

In the present disclosure, the "acrylic monomer" means acrylic acid or methacrylic acid, or a derivative of the acrylic acid or methacrylic acid, such as acrylic acid ester or methacrylic acid ester. In addition, the "(meth)acryl" means acryl or methacryl.

The acrylic polymer may be an adhesive polymer having adhesive performance. The acrylic polymer may include a polymerization unit of an alkyl (meth)acrylate monomer. The acrylic polymer may include a repeating unit (A) derived from an alkyl (meth)acrylate monomer.

In one example, the repeating unit (A) may be a compound of the following Chemical Formula 1.

[Chemical Formula 1]

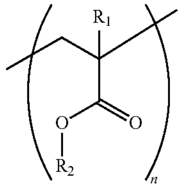

wherein in Chemical Formula 1, $R_1$ is a hydrogen atom or a methyl group, $R_2$ is a straight-chain or side-chain alkyl group having 1 to 12 carbon atoms, and n indicates the number of repetitions of the repeating unit (A) and is an integer of 450 to 850.

The repeating unit (A) contained in the acrylic polymer may be derived from an alkyl (meth)acrylate monomer having an alkyl group having 1 to 12 carbon atoms. Here, the alkyl group may be linear or branched. Specifically, examples of the alkyl (meth) acrylate monomer include methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth) acrylate, isononyl (meth)acrylate and/or lauryl (meth)acrylate, and the like. The alkyl (meth)acrylate monomer may be selected in consideration of the cohesive force, glass transition temperature, and adhesiveness of the final adhesive composition.

The acrylic polymer may further include, as an additional polymerization unit, a repeating unit of a copolymerizable monomer having a polar functional group for improving a cohesive force and the like. In the above, the copolymerizable monomer having a polar functional group may mean a monomer capable of copolymerizing with a compound forming an acrylic polymer, such as the aforementioned alkyl (meth)acrylate monomer. Further, the copolymerizable monomer having a polar functional group may mean a monomer capable of providing a polar functional group to a side chain or a terminal end of the polymer after being copolymerized to form an acrylic polymer. In the above, the polar functional group may be, for example, a functional group that can react with a crosslinking agent described later by the application of heat to implement a crosslinked structure, or can perform the role of improving the wettability of the adhesive layer. Examples of the polar functional group include a hydroxyl group, a carboxyl group or an anhydride group thereof, an acid group such as a sulfonic acid group or a phosphoric acid group, a glycidyl group, an amino group, an isocyanate group, or the like.

The acrylic polymer may include a polymerization unit of an alkyl (meth)acrylate monomer having a hydroxyl group. The acrylic polymer may include a repeating unit (B) derived from a (meth)acrylate monomer having a hydroxyl group.

In one example, the repeating unit (B) may be a compound of the following Chemical Formula 2.

[Chemical Formula 2]

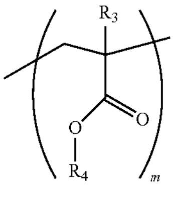

wherein in Chemical Formula 2, $R_3$ is a hydrogen atom or a methyl group, $R_4$ is a straight-chain or side-chain alkyl group having 1 to 9 carbon atoms to which a hydroxyl group is bonded, and m indicates the number of repetitions of the repeating unit (B) and is an integer of 200 to 350.

The (meth)acrylate monomer having a hydroxyl group may be a monomer capable of providing a hydroxyl group to the acrylic polymer after polymerization by simultaneously containing a site capable of copolymerizing with the other monomer for forming an acrylic polymer, and a hydroxyl group. The hydroxyalkyl (meth)acrylate monomer may include a hydroxyalkyl group having 1 to 9 carbon atoms. Examples of these monomers include 2-hydroxyethyl (meth)acrylate, 2-hydroxypropyl (meth)acrylate, 4-hydroxybutyl (meth)acrylate, 6-hydroxyhexyl (meth)acrylate, 7-hydroxyheptyl (meth)acrylate, 8-hydroxyoctyl (meth) acrylate, or the like.

The acrylic polymer may be a terpolymer formed through copolymerization of three kinds of acrylic monomers. Here, two of the three kinds of monomers may be an alkyl (meth)acrylate, and the other may be a (meth)acrylate having a hydroxyl group. The terpolymer may include two kinds of (meth)acrylate-based repeating unit (A), and may include a (meth)acrylate-based repeating unit (B) containing one kind of hydroxyl group. Here, the (meth)acrylate-based may mean being derived from a (meth)acrylate monomer.

In one example, the terpolymer may be a compound of the following Chemical Formula 3.

[Chemical Formula 3]

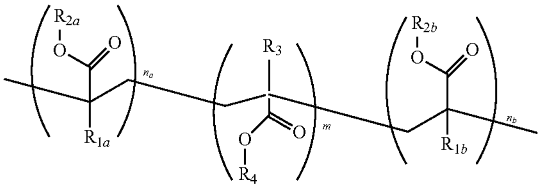

wherein in Chemical Formula 3, respective repeating units may be the aforementioned repeating unit (A) or repeating unit (B). $R_{1a}$, $R_{1b}$, and $R_3$ are a hydrogen atom or a methyl group, $R_{2a}$ and $R_{2b}$ are a straight-chain or side-chain alkyl group having 1 to 12 carbon atoms, and $R_4$ is a straight-chain or side-chain alkyl group having 1 to 9 carbon atoms to which a hydroxyl group is bonded. $n_a$ and $n_b$ indicate the number of repetitions and each of $n_a$ and $n_b$ is an integer of 450 to 850, and m indicates the number of repetitions and is an integer of 200 to 350.

In addition, in a terpolymer containing two or more kinds of repeating units (A) and repeating units (B), the coefficient ratio of the repeating unit (A) and the repeating unit (B) may be variously provided. For example, the coefficient ratio between the two or more kinds of repeating units (A) and repeating units (B) may be 80/20 to 70/30.

The repeating unit (A) and the repeating unit (B) contained in the acrylic polymer may be any one of the above-described examples, but it may be appropriately selected in consideration of the rigidity or adhesive performance of the final polymer.

Specifically, the acrylic polymer may be an adhesive polymer, and the adhesive polymer may exhibit different adhesive force or strength depending on the monomer. The glass transition temperature of the monomer may exhibit differently depending on the carbon number or structure of the alkyl group contained in the monomer, so that the adhesive performance of the polymer may be exhibited differently. Further, since the fluidity of the polymer may decrease/increase depending on the length or structure of the alkyl chain, the peel and shear strength of the polymer may be affected by the alkyl group contained in the monomer.

Typically, in order to impart the strength to the adhesive polymer, a methacrylate monomer is preferred over an acrylate monomer, and specific examples thereof include methyl methacrylate (MMA). In addition, in order to impart the flexibility of the adhesive polymer, the use of short chain length methyl acrylate (MA), ethyl acrylate (EA), 2-ethylhexyl acrylate (2-EHA) or the like may be considered. On the other hand, since the (meth)acrylate containing a hydroxyl group can improve the crosslinkability or wettability of the adhesive polymer, the viscosity can be increased by containing the hydroxy (meth)acrylate-based in the polymer.

For example, one of the two kinds of repeating units (A) contained in the acrylic polymer is an alkyl acrylate-based, and the other may be an alkyl methacrylate-based. In this case, an alkyl group having a larger number of carbon atoms than the end of the methacrylate-based repeating unit may be bonded to the end of the acrylate-based repeating unit. In a specific example, a straight-chain or side-chain alkyl group having 4 to 12 carbon atoms is bonded to the end of the acrylate-based repeating unit, and an alkyl group having 1 to 3 carbon atoms may be bonded to the end of the methacrylate-based repeating unit. This may be considered to be because methacrylate is stronger and harder than acrylate. This is because when an alkyl group with a long chain length is bonded to a methacrylate-based repeating unit with high strength, it is possible to weaken resistance to external stresses such as peel and shear strength due to the reduction of the fluidity.

In another example, when two kinds of repeating units (A) contained in the acrylic polymer are acrylate-based, at least one repeating unit (A) may include an alkyl group having 6 or more carbon atoms or an alkyl group having 10 or more carbon atoms. More specifically, when two kinds of repeating units (A) are acrylate-based, at least one repeating unit (A) may be derived from isobornyl acetate (IBoA). This may be to ensure the rigidity of the final polymer.

The acrylic polymer may contain 40 to 90 parts by weight of the above-mentioned two kinds of repeating units (A) and 10 to 60 parts by weight of the repeating unit (B) based on 100 parts by weight of the polymer. In addition, the acrylic polymer may contain 50 to 80 parts by weight of the repeating unit (A) and 20 to 50 parts by weight of the repeating unit (B) based on 100 parts by weight of the polymer. The ratio may be changed in consideration of the desired cohesive force or wettability. At this time, the ratio may be based on the case where only the above-mentioned repeating units are included in the acrylic polymer, and may be the one excluding a solvent or other material. That is, the sum of the repeating units may be 100 parts by weight.

As the acrylic polymer, for example, a polymer having a weight average molecular weight (Mw) of 90,000 to 150,000 or 110,000 to 140,000 or 120,000 to 130,000 may be used. When the molecular weight of the acrylic polymer is 90,000 or less, the adhesive force (adhesive force between the adhesive and the interface) may decrease, and when the molecular weight is 150,000 or more, there is a problem that the durability (cohesive force) of the adhesive polymer is lowered and the stability at the time of discharging the dispenser due to the increase in viscosity is lowered.

Meanwhile, in the present disclosure, the molecular weight of the adhesive composition may be measured using a normal method known in the art. Normal molecular weight measurements can be carried out using: a quantitative end-group analysis method for obtaining a molecular weight by a quantitative analysis of functional groups at the ends of molecular chains; a colligative utilization method utilizing physical properties such as osmotic pressure, vapor pressure lowering, boiling point elevation, freezing point depression (membrane osmotic method, vapor pressure osmotic pressure method, etc.), a light scattering method using light scattering, an ultracentrifugation method in which the molecular weight is measured by centrifuging a polymer solution and then analyzing a sedimentation rate or concentration distribution, a viscosity method using the viscosity of a polymer solution, a gel permeation chromatography (GPC) using high performance liquid chromatography (HPLC), or other methods. In the present disclosure, the “molecular weight” may mean “weight average molecular weight”.

The adhesive force possessed by the acrylic polymer may be preferably 15 to 20 gf/mm$^2$ or 25 gf/mm$^2$ or more. This may be because when the adhesive force is less than or equal to the above-mentioned range, it can easily peel off between adherends. When the acrylic polymer is used in the manufacturing process of the electrode assembly as described below, the acrylic polymer can be sufficiently fixed between the electrode and the separator only by allowing the acrylic polymer to satisfy at least the above range.

The viscosity of the acrylic polymer may be, preferably, 4000 cPs or less or 3500 cPs or less at 80° C. This is to ensure that when the adhesive composition containing the acrylic polymer is jetted through a jetting device, it is discharged in a uniform size. At this time, the temperature of the jetting device during discharge may be 100° C. to 150° C., preferably 120° C.

The acrylic polymer can be prepared by a known polymerization method. For example, the above-mentioned alkyl (meth) acrylate monomer and polar group-containing copolymerizable monomer and/or other comonomer are appropriately mixed in accordance with the desired weight ratio to obtain a monomer mixture, and the monomer mixture can be applied to conventional polymerization methods such as solution polymerization, photo polymerization, bulk polymerization, suspension polymerization, or emulsion polymerization to prepare an acrylic polymer. At this time, the polymerization temperature and polymerization time can be selected arbitrarily in accordance with the polymerization method or the kind of polymerization initiator used, and in one example, the polymerization temperature may be about 30 to 100° C. and the polymerization time may be 0.5 to 20 hours.

In the polymerization process of the acrylic polymer, a polymerization initiator or the like may be used together. The polymerization initiation is a medium for polymerizing each composition, and when the content thereof is less than 0.1 parts by weight, there is a possibility that unreacted monomers may remain in the composition, and when the content exceeds 5.0 parts by weight, there is a fear that an unreacted initiator may be present to reduce an adhesive force.

Any compound capable of causing the generation of radicals can also be used as the polymerization initiator, and mainly, a peroxide-based, azo compound-based, or the like can be used. Specifically, examples of the azo-based polymerization initiator may include azobisisobutyronitrile, azonitrile, azo-ester, azo-amide, azo-amidine, azo-imidazoline or a mixture thereof. Examples of the peroxide-based polymerization initiator may include benzoyl peroxide, acetyl peroxide, dilauryl peroxide, di-tert-butyl peroxide, cumyl hydroperoxide, hydrogen peroxide, or a mixture thereof. Further, in addition to the polymerization initiator, already known acetal-based, hemiacetal-based, and redox-based polymerization initiators can be used. The polymerization initiator is not limited by the above-mentioned examples, and thus, various polymerization initiators not mentioned herein can be used in the preparation of the acrylic polymer.

The adhesive composition of the present disclosure may include an additive in addition to the acrylic polymer which is the adhesive polymer. The additive may be a compound used in the adhesive formulation to increase the tackiness of the adhesive surface. The additive may be generally a material having a low molecular weight of 3,000 or less and a high glass transition temperature (Tg). The additive enhances the adhesive force of the polymer at room temperature and may function as a plasticizer for the polymer at high temperature. As the content of the additive in the adhesive composition increases, the toughness and tackiness of the adhesive composition can be increased and the viscosity can be decreased. Since an increase in the content of the additive may result in deterioration of the thermal stability and worsening the color and odor of the adhesive, the selection of an appropriate additive and optimization of the amount used should be considered in accordance with the required quality.

As the additive, for example, a terpene-based or a rosin-based may be mainly used, and examples thereof include polyterpene-based, terpene phenolic-based, rosin ester-based, and the like. The rosin ester-based has a very narrow molecular distribution, has both lipophilic and hydrophilic structures, and has the advantage that it can be widely used for various polymers.

The additive used in the adhesive composition may be selected in consideration of the solubility parameter of the adhesive polymer. To facilitate dissolution and dispersion, an additive having a solubility index similar to the solubility index of the adhesive polymer may be used in the preparation of the adhesive composition. Here, as the solubility index, a Hildebrand solubility parameter (HSP, unit $(MPa)^{0.5}$) may be used. It can be explained by the fact that dissolution, dispersion, etc. occur more easily as the HSP values between the two materials are similar.

Specifically, the HSP value may be calculated according to the following Equation.

$$\delta = \sqrt{\frac{\Delta H_V - RT}{V_m}}$$

wherein, $\Delta H_V$ may be the enthalpy of vaporization, and $V_m$ may be a molar volume. Further, R may be a gas constant, and T may be a temperature value. HSP is defined as the square root of the cohesive energy density, and the cohesive energy density may mean a value up to the point at which molecular units are completely separated. Therefore, a material including a (meth)acrylate type having a hydroxyl group may have a higher HSP value than a material including an alkyl (meth)acrylate-based. In addition, in the copolymer containing the above-mentioned two materials, as the ratio of the (meth)acrylate-based repeating unit having a hydroxyl group is higher, the HSP value can appear larger.

For example, the adhesive polymer of one embodiment polymerized with the monomer components and composition ratio as described above may have an HSP of 18 to 25, 20 to 25, or 21 to 23. At this time, examples of the additive that can be used include terpene phenol-based or rosin ester-based having an HSP of 19 to 22. Since polyterpene-based, which is one of the additives mainly used in adhesives, have an HSP of 16, it may not be suitable for application to the adhesive polymers described above. When an additive having a large difference in solubility index is applied to the adhesive polymer in this way, it is not easy to disperse and dissolve the adhesive polymer, and thus, a haze phenomenon that appears cloudy in the mixed solution may occur.

The adhesive composition may contain 30 to 70% by weight of the adhesive polymer and 30 to 70% by weight of the additive based on 100% by weight of the composition. In addition, the adhesive composition contains 50 to 70% by weight of the adhesive polymer and 30 to 50% by weight of the additive based on 100% by weight of the composition. The ratio may be changed in consideration of the desired toughness, tackiness or viscosity. At this time, the ratio may be based on the case where only the adhesive polymer and the additive are contained in the adhesive composition, and even when the adhesive composition contains a solvent or the like, it may be based on only the adhesive polymer and additives excluding the solvent or other materials.

The adhesive force of the adhesive composition can be further improved by adding an additive to the adhesive polymer, as compared with the case where it contains only the adhesive polymer. By containing the additive, the adhesive force of the adhesive composition can be improved to 25 gf/mm$^2$ or more, through which the long lifetime characteristics of the battery can be guaranteed. Specifically, the adhesive force of the adhesive composition may be 40 or more, 80 or more, 85 or more, 90 or more, and may be 40 to 45, 80 to 95 or 85 to 92 gf/mm$^2$ depending on the ratio of the additive.

The viscosity of the adhesive composition may be preferably 4000 cPs or less or 3500 cPs or less at 80° C., which may be for the purpose of discharging in a uniform size through the jetting device as described above. At this time, the diameter of the adhesive composition to be discharged may be 1 mm or less. In one example, the viscosity of the adhesive composition may have a value of 2200 to 2500 cPs or 2200 to 2400 cPs at 80° C.

The glass transition temperature of the adhesive composition may appear differently depending on the ratio of the adhesive polymer and the additive. When the ratio of the additive is increased, the glass transition temperature of the adhesive composition may be lowered. For example, when the adhesive polymer is contained in an amount of 50 parts by weight and the additive is contained in an amount of 50 parts by weight of the additive based on 100 parts by weight of the composition, the glass transition temperature of the adhesive composition may be −50 Tg (° C.) or less. In another example, when of the adhesive polymer is contained in an amount of 30 parts by weight and the additive is contained in an amount of 70 parts by weight based on 100 parts by weight of the composition, the glass transition temperature may have a value of −60 Tg (° C.) level. Here, 100 parts by weight of the composition may be a case where only the additive and the adhesive polymer are contained.

On the other hand, considering the long-term usability and safety of the adhesive composition, it may be preferable that the adhesive composition does not cause an oxidation reaction when voltage is applied. Specifically, it may be preferable that the adhesive composition does not cause an oxidation reaction when a voltage of 4.0V or more is applied.

On the other hand, the adhesive composition of the present disclosure may be provided in the form of a gel and can be used as an adhesive in itself. Therefore, the adhesive composition according to an embodiment of the present disclosure may not be provided in a form of being dissolved in another solvent or dispersed in a dispersion medium. The adhesive composition according to an embodiment of the present disclosure may be provided in the form of containing the acrylic polymer and additive themselves, or some additives in addition to the acrylic polymer and additive.

In the following, preferred examples are presented to assist in the understanding of the present disclosure. However, the following examples are given for illustrative purposes only, and the scope of rights of the present disclosure is not limited thereto.

In the following, the appropriate acrylic polymer is selected through Examples and Comparative Examples of the acrylic polymer, and Examples and Comparative Examples of the adhesive compositions including the selected acrylic polymers and additives will be described.

1. Preparation of Acrylic Polymer

Methyl methacrylate (MMA), butyl acrylate (BA), 2-ethylhexyl acrylate (2-EHA) and/or 2-hydroxyethyl acrylate (2-HEA) were mixed in the monomer ratios (wt %) shown in Table below to prepare a monomer mixture. Methyl methacrylate (MMA), butyl acrylate (BA), 2-ethylhexyl acrylate (2-EHA), and 2-hydroxyethyl acrylate (2-HEA) can be represented by the following Chemical Formulas 4 to 7, respectively.

[Chemical Formula 4]

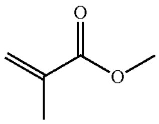

[Chemical Formula 5]

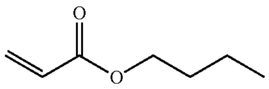

-continued

[Chemical Formula 6]

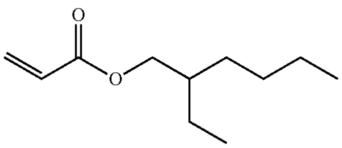

-continued

[Chemical Formula 7]

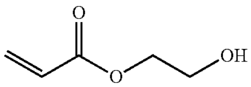

Benzoyl peroxide as a polymerization initiator was mixed with the monomer mixture in an amount of 2 parts by weight to 2.5 parts by weight based on 100 parts by weight of the monomer mixture, and distilled water was placed in a round flask, and polyvinyl alcohol (PVA) as a suspending agent was completely dissolved to prepare a suspension. Here, the PVA can be used at a level of 0.2 parts by weight based on 100 parts by weight of the monomer mixture. After creating polymerization conditions in an atmosphere of 90° C. using a heating mantle located at the bottom of the round flask, the monomer mixture containing the polymerization initiator was placed in a round flask and stirred for 3 hours or more. After stirring, the acrylic polymer contained in the mixed solution was filtered through filter paper, washed, and then dried in a vacuum oven for at least one day.

The acrylic polymer prepared by the above-mentioned preparation method is provided as follows. The molecular weight, viscosity, adhesive force, and dispenser jetting stability of the acrylic polymer were evaluated. A detailed evaluation method for the following adhesive force and dispenser jetting stability will be described later.

TABLE 1

| | Monomer ratio | | | | Molecular weight | | Viscosity | Dispenser jetting | Adhesive force |
|---|---|---|---|---|---|---|---|---|---|
| | MMA | 2-EHA | BA | 2-HEA | Mw | PDI | @80° C. | stability | ($gf/mm^2$) |
| Preparation Example 1 | 40 | 30 | — | 30 | $1.25 \times 10^5$ | 1.2 | 2800~2850 | OK | 27~30 |
| Comparative Preparation Example 1 | 40 | 40 | | 20 | $1.28 \times 10^5$ | 1.35 | 2870~2910 | OK | 13~15 |
| Comparative Preparation Example 2 | 20 | 40 | | 40 | $1.33 \times 10^5$ | 1.95 | >3500 | NG | — |
| Comparative Preparation Example 3 | 20 | 30 | | 50 | $1.32 \times 10^5$ | 1.97 | >3500 | NG | — |
| Comparative Preparation Example 4 | 50 | 40 | | 10 | $1.21 \times 10^5$ | 1.24 | 2450~2480 | OK | <10 |
| Comparative Preparation Example 5 | 30 | 10 | | 60 | $1.06 \times 10^5$ | 1.95 | >3500 | NG | — |
| Preparation Example 1-1 | 40 | — | 30 | 30 | $1.17 \times 10^5$ | 1.19 | 2750~2780 | OK | 20~23 |
| Preparation Example 1-2 | 35 | — | 35 | 30 | $1.32 \times 10^5$ | 1.27 | 2830~2860 | OK | 25~28 |
| Comparative Preparation Example 1-1 | 40 | — | 40 | 20 | $1.26 \times 10^5$ | 1.32 | 2800~2820 | OK | <10 |
| Comparative Preparation Example 1-2 | 50 | — | 40 | 10 | $1.09 \times 10^5$ | 1.42 | 2300~2330 | OK | <10 |

Referring to Table 1 above, the acrylic polymer according to Preparation Example 1 had a molecular weight of 90000 to 150000, specifically, a value of 120000 to 140000, and had a viscosity of 3000 cPs or less at 80° C.

Comparative Preparation Example 1 exhibited approximately the same level of physical properties as that of Preparation Example 1, except for adhesive force. However, the adhesive force of Comparative Preparation Example 1 was the half level of Preparation Example 1, and the performance as an adhesive composition appeared slightly inferior. This can be because the ratio of monomers containing hydroxy groups was slightly low.

In Comparative Preparation Examples 2 and 3, the content of 2-HEA, which was a monomer containing a hydroxyl group, was 40% or more which was slightly higher than that of Preparation Example 1. Consequently, it can be confirmed that the viscosity and the like increased, and the dispenser jetting stability appeared slightly low. In addition, since Comparative Preparation Examples 2 and 3 contained 2-EHA in a higher ratio than MMA, the above-mentioned increase in viscosity and the decrease in dispenser jetting stability accompanied therewith may be due to the content of 2-EHA.

In Comparative Preparation Example 4, it can be confirmed that the content of 2-HEA, which was a monomer containing a hydroxyl group, was 10% which was slightly lower than that of Preparation Example 1, and the adhesive force was significantly reduced.

In Comparative Preparation Example 5, it can be confirmed that the content of 2-HEA, which was a monomer containing a hydroxyl group, was 60% which was slightly higher than that of Preparation Example 1, whereby the viscosity and the like increased, and the stability of jetting dispensers appeared slightly low.

The acrylic polymer according to Preparation Example 1-1 had a molecular weight of 80000 to 140000, specifically, a value of 110000 to 130000, and had a viscosity of 3000 cPs or less at 80° C.

The acrylic polymer according to Preparation Example 1-2 had a molecular weight of 100000 to 160000, specifically, a value of 120000 to 140000, and had a viscosity of 3000 cPs or less at 80° C.

In the case of Preparation Example 1-1, the adhesive force was slightly reduced compared to Preparation Example 1, but in the case of Preparation Example 1-2, the amount of MMA was reduced compared to Preparation Example 1-1, and the amount of BA (butyl acrylate) was increased so that the adhesive force can be supplemented.

Comparative Preparation Example 1-1 exhibited approximately the same level of physical properties as that of Preparation Example 1, except for adhesive force. However, the adhesive force of this comparative Preparation example was less than half that of Preparation Example 1-1, and the performance as an adhesive composition was inferior. This may be due to a rather low proportion of the monomer containing a hydroxyl group.

In Comparative Preparation Example 1-2, it can be confirmed that the content of 2-HEA, which was a monomer containing a hydroxyl group, was 20% which was slightly lower than that of Preparation Example 1-1, and the adhesive force was significantly reduced.

Referring to these measurement results, the physical properties of Preparation Example 1, Preparation Example 1-1, and Preparation Example 1-2, which had relatively excellent dispenser jetting stability and adhesive force, appeared to be more suitable for use in the adhesive composition than the other Examples and Comparative Examples. This can be because if the ratio of the monomer containing a hydroxyl group is 40% or more, the viscosity increases significantly and thus, the dispenser jetting stability may decrease slightly, and if the ratio is 20% or less, the basic adhesive force required for the adhesive composition is significantly reduced.

Referring to the ratio between the monomers shown in Table 1 above, the acrylic polymer can suitably contain more than 20 parts by weight and less than 40 parts by weight of a hydroxy alkyl (meth)acrylate monomer based on 100 parts by weight of the monomer mixture. The acrylic polymer can preferably contain 60.1 to 79.9 parts by weight of an alkyl (meth)acrylate monomer and 20.1 to 39.9 parts by weight of the hydroxy alkyl (meth)acrylate monomer based on 100 parts by weight of the monomer mixture.

In a preferred example, the weight average molecular weight of the acrylic polymer may be 120000 to 140000. In a preferred example, the viscosity of the acrylic polymer can be 2750 cPs to 3500 cPs or 2800 cPs to 3000 cPs at 80° C., and the adhesive force of the acrylic polymer can be 20 $gf/mm^2$ or more, or 25 $gf/mm^2$ or more, or 27 $gf/mm^2$ or more.

2. Preparation of Adhesive Composition Containing Additive

Example 1

Preparation of Acrylic Polymer

In this Example, the acrylic polymer of Preparation Example 1 was used.

Preparation of Additive

As an additive of this Example, SYLVALITE™ RE 10 L, which is a rosin ester-based material and is sold by KRATON, was used as the rosin ester-based material. Hereinafter, SYLVALITE™ RE 10 L is referred to as a first additive.

Preparation of Adhesive Composition

The obtained acrylic polymer and the first additive were added to prepare an adhesive composition. Here, based on the exclusion of other additives and the like, the acrylic polymer and the first additive were mixed in a ratio of 30 wt % and 70 wt %, respectively.

Example 2

This Example was prepared in the same manner as in Example 1, except that in the preparation of the adhesive composition, the ratio of the acrylic polymer and the first additive were changed so as to be mixed in a ratio of 50 wt %, respectively.

Example 3

This Example was prepared in the same manner as in Example 1, except that in the preparation of the adhesive composition, the ratio of the acrylic polymer and the first additive were changed so as to be mixed in a ratio of 70 wt % and 30 wt %, respectively.

Example 4

This Example was prepared in the same manner as in Example 1, except that the fourth additive was used instead of the first additive, and the acrylic polymer and the fourth additive were mixed at a ratio of 30 wt % and 70 wt %, respectively. The fourth additive was a rosin ester-based material, and SYLVALITE™ RE 25 sold by KRATON was used. Hereinafter, SYLVALITE™ RE 25 is referred to as the fourth additive.

Example 5

This Example was prepared in the same manner as in Example 4, except that in the preparation of the adhesive composition, the ratio of the acrylic polymer and the fourth additive were changed so as to be mixed in a ratio of 50 wt % and 50 wt %, respectively.

Example 6

This Example was prepared in the same manner as in Example 4, except that in the preparation of the adhesive composition, the ratio of the acrylic polymer and the fourth additive were changed so as to be mixed in a ratio of 70 wt % and 30 wt %, respectively.

Comparative Example 1

This Comparative Example was prepared in the same manner as in Example 1, except that the second additive was used instead of the first additive, and the acrylic polymer and the third additive were mixed in a ratio of 50 wt %, respectively. Here, the second additive is SYLVARES™ TP 300, which is a terpene phenol-based additive and is sold by KRATON.

Comparative Example 2

This Comparative Example was prepared in the same manner as in Example 1, except that the third additive was used instead of the first additive, and the acrylic polymer and the third additive were mixed in a ratio of 50 wt %, respectively. Here, the third additive was SYLVARES™ TR M1115, which is a polyterpene-based additive and is sold by KRATON.

Comparative Example 3

This Comparative Example was prepared in the same manner as in Example 1, except that in the preparation of the adhesive composition, the ratio of the acrylic polymer and the first additive were changed so as to be mixed in a ratio of 75 wt % and 25 wt %, respectively.

Comparative Example 4

This Comparative Example was prepared in the same manner as in Example 1, except that in the preparation of the adhesive composition, the ratio of the acrylic polymer and the first additive were changed so as to be mixed in a ratio of 20 wt % and 80 wt %, respectively.

Comparative Example 5

This Comparative Example was prepared in the same manner as in Example 1, except that in the preparation of the adhesive composition, the ratio of the acrylic polymer and the first additive were changed so as to be mixed in a ratio of 25 wt % and 75 wt %, respectively.

Comparative Example 6

This Comparative Example was prepared in the same manner as in Example 1, except that in the preparation of the adhesive composition, the ratio of the acrylic polymer and the first additive were changed so as to be mixed in a ratio of 80 wt % and 20 wt %, respectively.

Comparative Example 7

This Comparative Example was prepared in the same manner as in Example 4, except that in the preparation of the adhesive composition, the ratio of the acrylic polymer and the fifth additive were changed so as to be mixed in a ratio of 20 wt % and 80 wt %, respectively.

Comparative Example 8

This Comparative Example was prepared in the same manner as in Example 4, except that in the preparation of the adhesive composition, the ratio of the acrylic polymer and the fourth additive were changed so as to be mixed in a ratio of 25 wt % and 75 wt %, respectively.

Comparative Example 9

This Comparative Example was prepared in the same manner as in Example 4, except that in the preparation of the adhesive composition, the ratio of the acrylic polymer and the fourth additive were changed so as to be mixed in a ratio of 75 wt % and 25 wt %, respectively.

Comparative Example 10

This Comparative Example was prepared in the same manner as in Example 4, except that in the preparation of the adhesive composition, the ratio of the acrylic polymer and the fourth additive were changed so as to be mixed in a ratio of 80 wt % and 20 wt %, respectively.

Evaluation of Adhesive Composition

Table 2 below is a table for evaluating the viscosity, glass transition temperature, dispenser jetting stability, adhesive strength and the like of the adhesive compositions of Examples 1 to 6 and Comparative Examples 1 to 10.

The molecular weight of the adhesive composition can be measured using a conventional method known in the art. The molecular weight of the present Examples and Comparative Examples is a weight average molecular weight that represents the values measured by GPC (Gel Permeation Chromatograph) as the numerical values based on the standard polystyrene, and the values of the Examples appeared in the range of 70000 to 850000 (PDI>2.5).

The viscosity of the adhesive composition can be measured using a conventional method known in the art. Conventional viscosity measurement can be performed using a capillary viscometer, a rotational viscometer, a falling ball viscometer, a pressure driven method, or other devices and methods. The viscosity of the Examples and Comparative Examples was measured using Anton Paar's MCR-302 Rheometer (Cone plate: 25 mmφ ∠=2°, 1 Hz, d=0.105 mm), and the value appeared in the range of 4000 cPs or less, 35000 cPs or less, 2200 cPs to 2500 cPs or 2200 cPs to 2400 cPs at 80° C.

The glass transition temperature of the adhesive composition can be measured using a conventional method known in the art. For example, the glass transition temperature can be measured using DSC (Differential Scanning Calorimetry).

Figure 2:
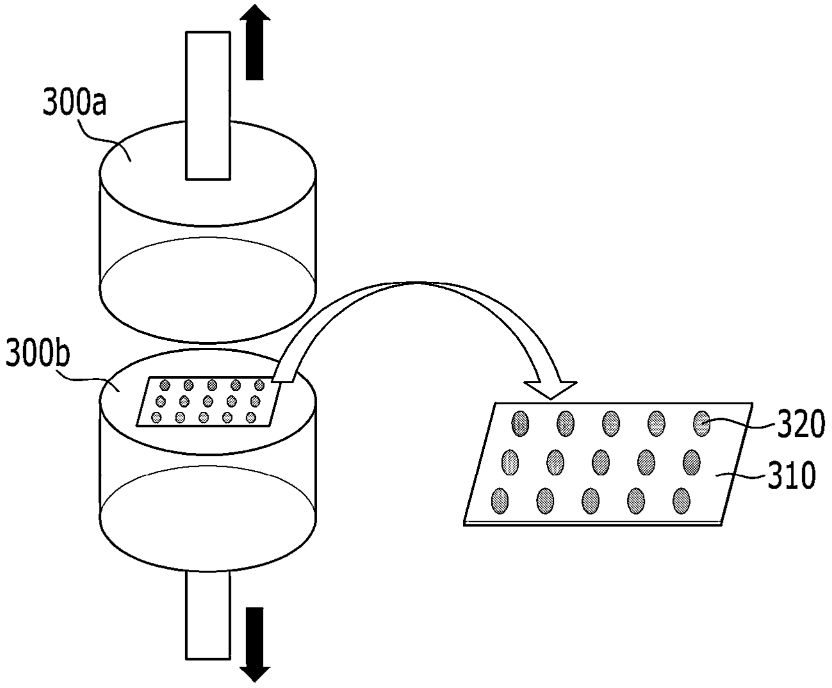
FIG. 2 is a diagram for explaining a method for measuring the adhesive force of the adhesive composition according to an embodiment of the present disclosure.

The adhesive force of the adhesive composition can be measured using a conventional method known in the art. In a specific example, the adhesive composition 320 is applied in the form of 15 dots at an interval of 3 mm between the two adherents 310 as shown in FIG. 2, and then the adherends 310 to which the adhesive composition 320 is applied is placed between the two tension jigs 300*a* and 300*b*, and the tensile jigs are moved in a direction perpendicular to one surface of the adherends 310. Thereby, the adhesive force can be measured.

The stability of jetting dispensers was evaluated by performing a continuous injection for 30 minutes using a dispenser (manufactured by Nordson) and then comparing the diameters of the dots. Specifically, the diameter of the dots discharged at a first time point was compared with the diameter of the dots discharged at the second time point which is 30 minutes after the first time point, and when the dot diameter deviation was less than 5%, it was evaluated as satisfying the jetting stability (OK). Experiments were performed using a piezo-driven Vulcan dispenser, and the temperature of the dispenser was 120° C. during dispensing.

Preparation Example 1 was used, and as the ratio of the first additive increases, the aspect appeared in which the viscosity and glass transition temperature of the adhesive composition are lowered, and the adhesive force is improved. Specifically, the adhesive compositions according to Examples 1 to 6 had a viscosity of 2200 cPs to 2500 cPs at 80° C., and a glass transition temperature of −40 Tg (° C.) or less.

Looking at the point that the adhesive force of the adhesive compositions of Examples 1 to 6 was greater than that of the conventional adhesive polymer (27~30 gf/mm$^2$), it can be inferred that the adhesive polymer and the first additive (or the adhesive polymer and the fourth additive) were well mixed with each other. Here, Example 2 and Example 3 did not show a significant difference in viscosity values, whereas the adhesive strength appeared a nearly double difference. Thus, Example 2 or Example 1 can be more preferable than Example 3 for use as an adhesive. Specifically, the adhesive compositions according to Examples 2 and 3 had a viscosity of 2300 to 2500 cPs at 80° C., and a glass transition temperature of −55 Tg (° C.) or less.

TABLE 2

| | Ratio of adhesive resin | | | | | | | | | Adhesive | Dispense |
|---|---|---|---|---|---|---|---|---|---|---|---|
| | Acrylic | Additive | | | | $T_g$(° C.) of | Viscosity | | | force | jetting |
| | polymer | 1 | 2 | 3 | 4 | additive | @80° C. | $T_g$(° C.) | | (gf/mm$^2$) | stability |
| Example 1 | 30 | 70 | — | — | — | −30 | 2200~2230 | −60 | | 90~92 | OK |
| Example 2 | 50 | 50 | — | — | — | −30 | 2350~2380 | −55~−50 | | 85~90 | OK |
| Example 3 | 70 | 30 | — | — | — | −30 | 2400~2450 | −40~−35 | | 40~45 | OK |
| Example 4 | 30 | — | — | — | 70 | −13 | 2210~2230 | −48 | | 81~83 | OK |
| Example 5 | 50 | — | — | — | 50 | −13 | 2400~2430 | −45~−40 | | 78~82 | OK |
| Example 6 | 70 | — | — | — | 30 | −13 | 2430~2460 | −40 | | 40 | OK |
| Comparative Example 1 | 50 | — | 50 | — | — | 68 | >3200 | 30~35 | | <10 | — |
| Comparative Example 2 | 50 | — | — | 50 | — | 60 | >3500 | — | | — | — |
| Comparative Example 3 | 75 | 25 | — | — | — | −30 | 2500~2510 | −31~−28 | | −30 | OK |
| Comparative Example 4 | 20 | 80 | — | — | — | −30 | <2000 | −62 | | 80~83 | NG |
| Comparative Example 5 | 25 | 75 | — | — | — | −30 | 2080~2100 | −62 | | 81~82 | NG |
| Comparative Example 6 | 80 | 20 | — | — | — | −30 | 2520~2570 | −25~−22 | | ~20 | OK |
| Comparative Example 7 | 20 | — | — | — | 80 | −13 | <2000 | −50 | | 73~75 | NG |
| Comparative Example 8 | 25 | — | — | — | 75 | −13 | 2110~2130 | −50 | | 71 | NG |
| Comparative Example 9 | 75 | — | — | — | 25 | −13 | 2550~2560 | −25 | | ~25 | OK |
| Comparative Example 10 | 80 | — | — | — | 20 | −13 | 2600~2620 | −20 | | ~20 | OK |

The adhesive polymers contained in Examples 1 to 6 and Comparative Examples 1 to 10 were prepared according to Preparation Example 1 described above, and have a solubility index of 18 to 25 HSP or 20 to 25 HSP, preferably 21 to 23 HSP. Here, the first additive and/or the fourth additive used in Examples 1 to 6 can be a rosin ester-based material, and can have a solubility index of HSP of 19 to 22. In addition, the adhesive polymers contained in Examples 1 to 6 and Comparative Examples 2 to 8 can have a glass transition temperature of −100 to −90° C., or a value close to −95° C.

The first additive used in Examples 1 to 3 and the fourth additive used in Examples 4 to 6 had a glass transition temperature value of 0° C. or less. The first additive had a glass transition temperature value of −25° C. or less and −35° C. or more, or a value close to −30° C., and the fourth additive had a glass transition temperature close to −13° C. The glass transition temperature values of the second to third additives used in Comparative Examples 1 and 2 were higher than the glass transition temperature values of the first additive and the fourth additive.

In Examples 1 to 6, the first additive having a solubility index similar to that of the adhesive polymerization agent of Comparing Example 2 and Comparative Examples 1 and 2 containing the adhesive polymer in the same ratio, it was shown that the viscosity and glass transition temperature were greatly increased and the adhesive force was slightly decreased, depending on the type of additive.

On the other hand, in Comparative Example 1 in which the terpene phenol-based second additive was used, the adhesive force of Comparative Example 1 appeared lower than that of the adhesive polymerization agent and Example 2, and the viscosity and glass transition temperature appeared higher. This may be because the adhesive properties of the material itself were inferior as estimated by the glass transition temperature of the second additive. In addition, this can also be because the solubility index processed by the terpene phenol-based second additive had a large difference from the solubility index of the adhesive polymer, so that the adhesive polymer and the additive did not mix well with each other.

In Comparative Example 2, the polyterpene-based third additive having an HSP of 16 was used, and a haze was observed with the naked eye, and thus a separate adhesive force was not measured. However, considering that the dispersibility with the adhesive polymer was very low, it was expected to have the same or lower adhesive strength as that of Comparative Example 1.

Referring to the ratio between the additive and the copolymer shown in Table 2 above, it may be desirable that based on 100 parts by weight of the adhesive composition, the copolymer was contained in an amount of 30 to 70 parts by weight and the additive was contained in an amount of 30 to 70 parts by weight. Further, it may be preferable that based on 100 parts by weight of the adhesive composition, the copolymer was contained in an amount of 30 to 50 parts by weight and the additive was contained in an amount of 50 to 70 parts by weight. At this time, here, 100 parts by weight of the adhesive composition may be a case where only the copolymer and the additive are contained. That is, the sum of the additive and the copolymer may be 100 parts by weight.

In the case of Comparative Examples 3 and 6, the adhesive force was greatly reduced compared to Examples 1 to 3, and in the case of Comparative Examples 4 and 5, the adhesive was formed on the tip of the dispenser after a certain period of time, so that the dot size deviation of the adhesive occurs. Therefore, a problem arose in the stability of the dispenser jetting.

In the case of Comparative Examples 7 and 8, the adhesive force was slightly reduced compared to Examples 4 and 5, but the adhesive was formed on the tip of the dispenser after a certain period of time, and the dot size deviation of the adhesive occurred, so there is a problem in the jetting stability of the dispenser.

In the case of Comparative Examples 9 and 10, the adhesive force was greatly reduced compared to Examples 4 to 5.

In a preferred example, the glass transition temperature (Tg) (° C.) of the adhesive composition may be −40 or less or −50 or less. In a preferred example, the viscosity of the adhesive composition may be 2200 cPs to 2500 cPs or 2200 cPs to 2400 cPs at 80° C. In a preferred example, the adhesive force of the adhesive composition may be 40 $gf/mm^2$ or more, 85 $gf/mm^2$ or more, or 85 to 92 $gf/mm^2$ or more.

Figure 3:
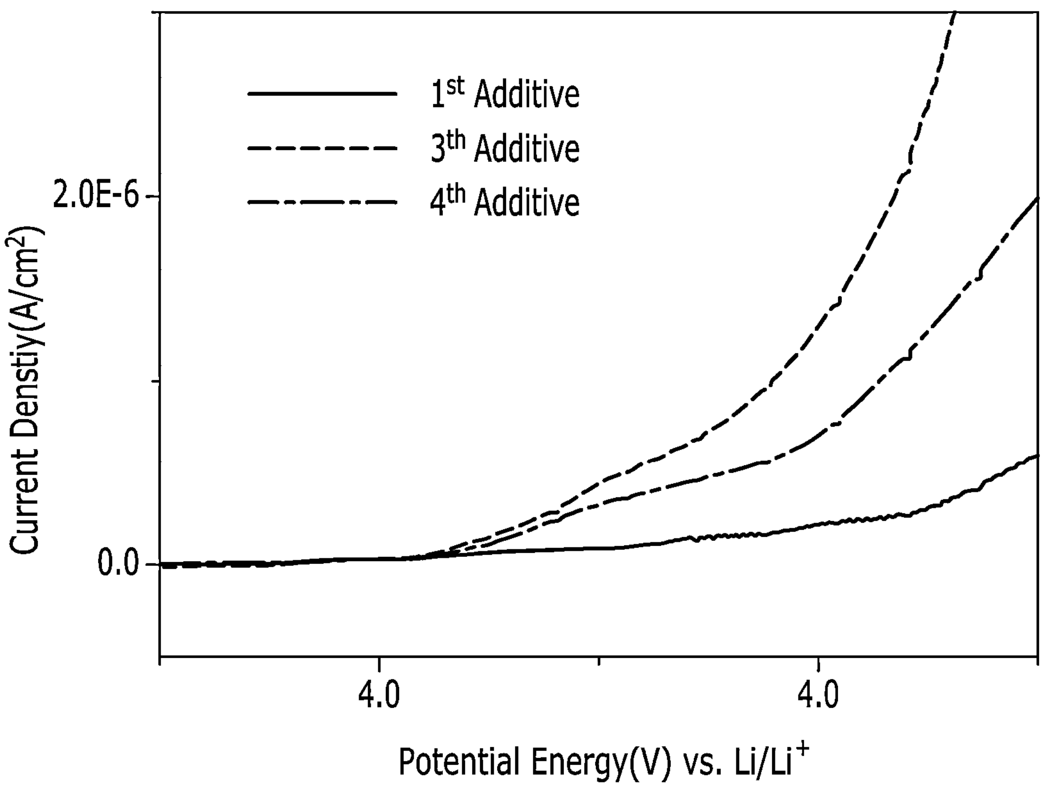
FIG. 3 is a diagram showing LSV (Linear Sweep Voltammetry) of the adhesive composition according to an embodiment of the present disclosure.

Meanwhile, FIG. 3 is a diagram showing LSV (Linear Sweep Voltammetry) of the adhesive composition according to an embodiment of the present disclosure.

Referring to FIG. 3, the adhesive composition containing the first additive did not exhibit an oxidation reaction even at 4.0V or more, but the adhesive composition containing the second additive and the third additive exhibited an oxidation reaction at 4.0V or more, specifically 4.0V to 4.5V. Considering these points, the chemical stability of the rosin ester-based additive may be superior to that of the terpene phenol-based or polyterpene-based additive.

In the following, preferred examples of the adhesive composition are presented to assist in the understanding of the present disclosure. However, the following examples are for illustrative purposes only, and the scope of the present disclosure is not limited thereto.

Figure 4:
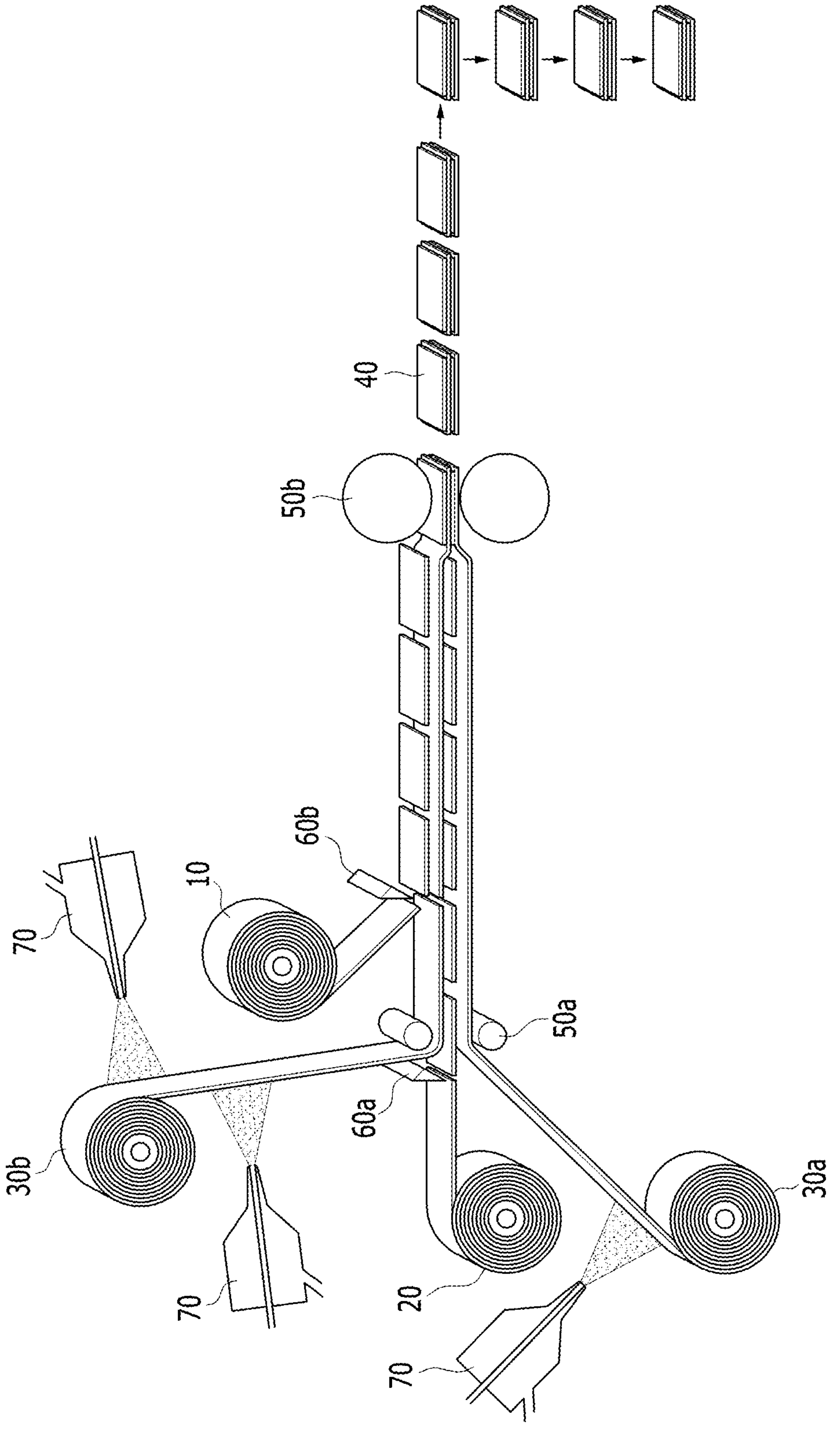
FIG. 4 is a diagram showing one example in which the adhesive composition according to an embodiment of the present disclosure is used in the manufacturing process of the electrode assembly.
Figure 5:
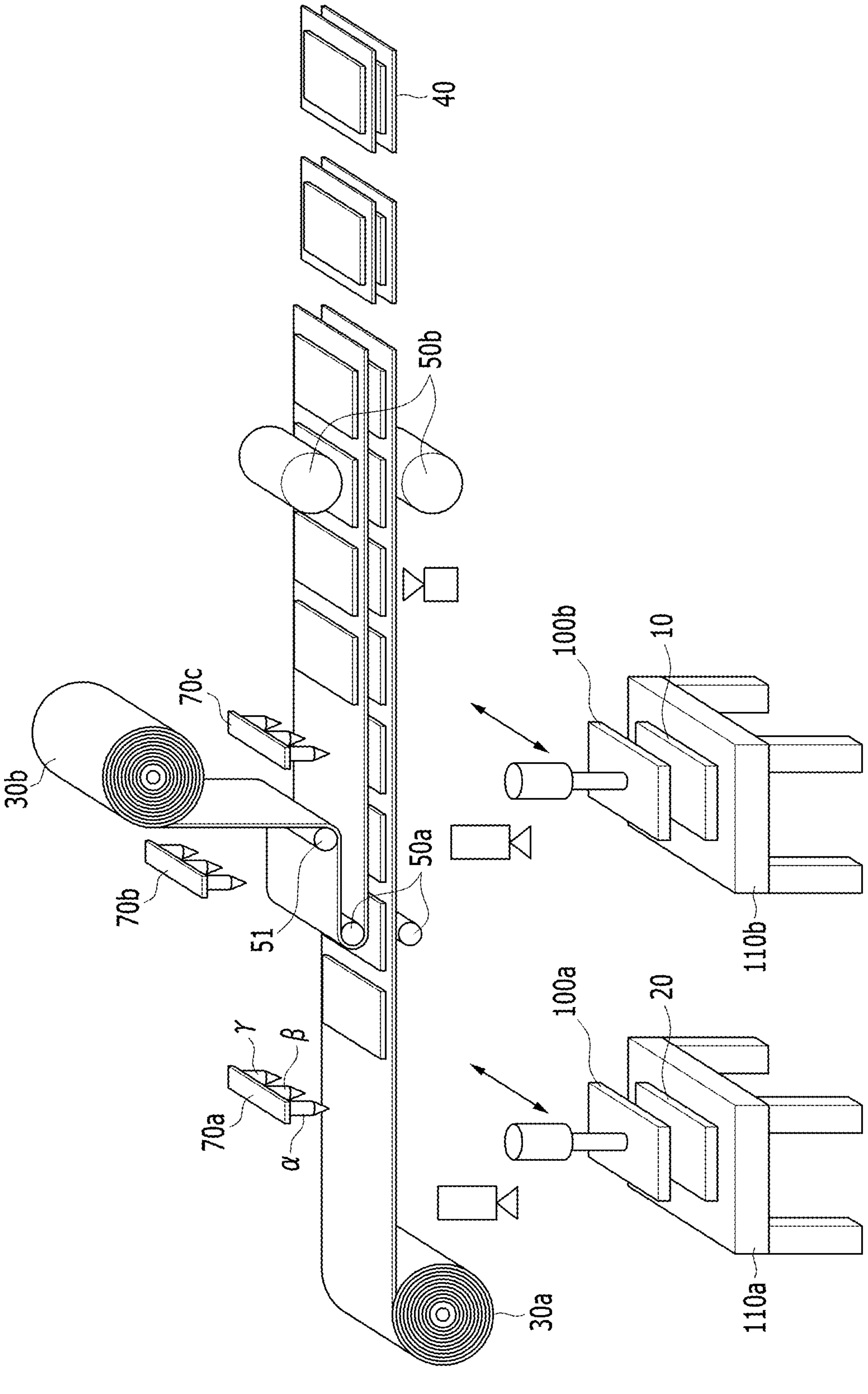
FIG. 5 is a diagram showing another example in which the adhesive composition according to an embodiment of the present disclosure is used in the manufacturing process of the electrode assembly.

FIG. 4 is a diagram showing one example in which the adhesive composition according to an embodiment of the present disclosure is used in the manufacturing process of the electrode assembly; and FIG. 5 is a diagram showing another example in which the adhesive composition according to an embodiment of the present disclosure is used in the manufacturing process of the electrode assembly.

Referring to FIGS. 4 and 5, the adhesive composition of this embodiment can be provided to fix between the separator or the electrodes in the process of manufacturing the electrode assembly. The adhesive composition of this embodiment can be provided to the separator before the anode and the cathode are introduced. The adhesive composition of this embodiment may be used as it is, or may be provided as a so-called adhesive further containing other materials.

Specifically, in the process of manufacturing the electrode assembly, the separators 30*a* and 30*b* may be provided in at least two places, respectively, and may be continuously introduced. By inputting the cathode 10 or the anode 20 thereto, a unit cell 40 having the order of cathode 10/upper separator 30*b*/anode 20/lower separator 30*a*, or anode 20/upper separator 30*b*/cathode 10/lower separator 30*a* can be manufactured. The cathode 10 or the anode 20 can be cut to a predetermined size through respective cutters 60*a* and 60*b* before being laminated on the separators 30*a* and 30*b*.

At this time, the adhesive composition may be applied at a position where the electrodes 10 and 20 are directly adhered to the separators 30*a* and 30*b* or at a position where the separators 30*a* and 30*b* are adhered to each other, and can limit the electrodes 10 and 20 from deviating from a predetermined position.

The adhesive composition can be provided through a jetting device 70, the method of which is not limited, but for example, it may be provided by a method such as spray jetting, inkjet jetting, or the like.

Here, the jetting direction of the adhesive composition may differ depending on the position where the separators 30*a* and 30*b* are provided as shown in FIG. 4, but it can also be provided vertically (top to bottom) to minimize the effects of gravity, as shown in FIG. 5. Here, the jetting direction may be fixed as shown in FIG. 5, but it is not necessarily the case, and the jetting direction may be adjusted in accordance with the usage environment.

When provided as shown in FIG. 5, the jetting device 70 can include a first nozzle 70*a*, a second nozzle 70*b*, and a third nozzle 70*c* for jetting an adhesive on one surface of the separators 30*a* and 30*b*. Here, the first nozzle 70*a* can jet an adhesive to the lower separator 30*a*, and the second nozzle 70*b* and the third nozzle 70*c* can jet an adhesive on two surfaces of the upper separator 30*b*, respectively. At this time, the moving directions of the separators 30*a* and 30*b* can be switched through a guide roller 51. More specifically, the first nozzle 70*a* jets an adhesive to the lower separator 30*a* before the anode 20 is provided to the lower separator 30*a*, the second nozzle 70*b* jets the adhesive to the upper separator 30*b* after the anode 20 is provided to the lower separator 30*a*, and the third nozzle 70*c* can jet the adhesive to the upper separator 30*b* before the cathode 10 is provided to the upper separator 30*b*.

Here, respective nozzles 70*a*, 70*b* and 70*c* can include a large number of nipples α, β and γ that are spaced apart from each other, and the jetting speed, jetting amount, jetting area, etc. can be individually adjusted. Thereby, the adhesive can be applied at narrow intervals or at wide intervals as needed.

When provided as shown in FIG. 5, the electrodes 10 and 20 can be stored in a pre-cut state and moved to the separators 30*a* and 30*b* by a first gripper 100*a* and a second gripper 100*b*. At this time, the electrodes 10 and 20 can be moved by tables 110*a* and 110*b*.

After the adhesive is applied, the laminated separators 30*a* and 30*b* and the electrodes 10 and 20 can pass between nip rollers 50*a* and 50*b*, and the coupling force between the separators 30*a* and 30*b* and the electrodes 10 and 20 can be improved through the nip rollers 50*a* and 50*b*. At this time, the pressure or temperature applied by the nip rollers 50*a* an d 50*b* can be lower than the pressure or temperature conventionally applied.

Thus, when the adhesive composition of the present disclosure is provided in the manufacturing process of the electrode to perform lamination between the electrodes 10 and 20 and the separators 30*a* and 30*b*, heat and pressure may not be applied, or heat and pressure that are weaker than before may be applied. Therefore, in the manufacturing process, misalignment between the separators 30*a* and 30*b* and the electrodes 10 and 20 can be prevented, and breakage and deformation of the separators 30*a* and 30*b* and the electrodes 10 and 20 can be prevented.

Among the various usage examples in which the adhesive composition can be used in the above, some cases used in electrode assemblies have been described, and FIGS. 4 and 5 are provided only to assist in the understanding of the manufacturing process of an electrode assembly in which the adhesive composition can be used, and usage examples of the adhesive composition should not be limited by the contents described above. Therefore, it is apparent that the adhesive composition according to an embodiment of the present disclosure can be used in various ways in addition to the above-mentioned examples, and the adhesive composition according to the present embodiment can be widely used not only in the manufacturing process of the electrode assembly but also in other industrial fields.

Hereinafter, a unit cell containing the adhesive composition according to an embodiment of the present disclosure will be described. The unit cells described below may be formed through the manufacturing process of the electrode assembly manufacturing process as described above, but it should be noted in advance that it is not necessarily the case and it may be formed by a method different from the above-described usage example.

Figure 6:
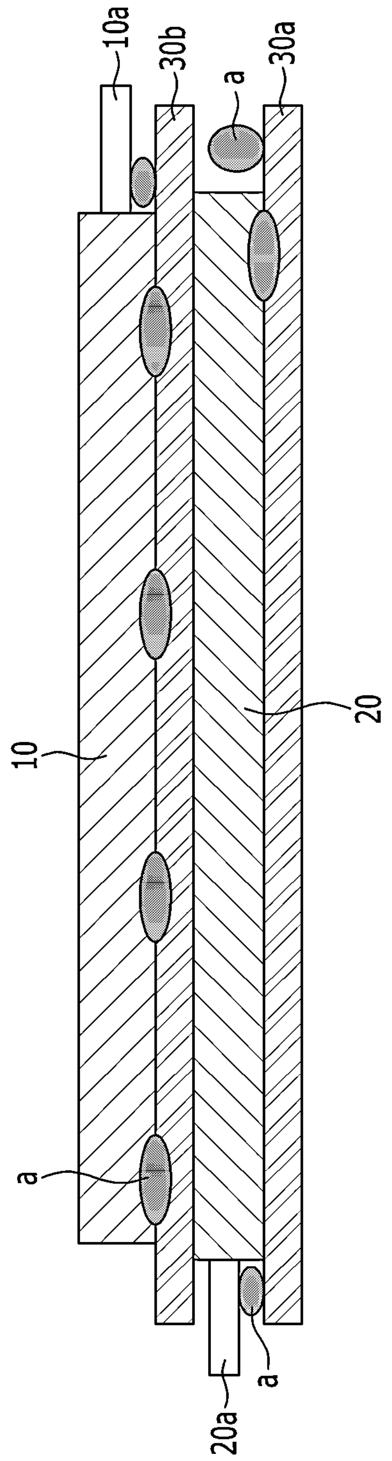
FIG. 6 is a diagram showing a unit cell including an adhesive composition according to an embodiment of the present disclosure.

FIG. 6 is a diagram showing a unit cell including an adhesive composition according to an embodiment of the present disclosure.

Referring to FIG. 6, the unit cell of this embodiment can be manufactured by being laminated from the bottom to the top in the order of a lower separator 30*a*, any one electrode 10, 20 of the anode or the cathode, an upper separator 30*b*, another electrode 10, 20 of the anode and the cathode. Here, the adhesive (a) can be applied to at least one surface of the electrodes 10 and 20 and the separators 30*a* and 30*b*, through which the electrodes 10 and 20 and the separators 30*a* and 30*b* can be fixed to each other. Further, here, in FIG. 6, it is shown in a structure in which the lower separator 30*a*, the anode 20, the upper separator 30*b*, and the cathode 10 are laminated from the bottom to the top, but it is not necessarily the case, and the lower separator 30*a*, the cathode 10, the upper separator 30*b*, and the anode 20 may be laminated in this order. Here, the adhesive (a) may include the adhesive composition described above.

The adhesive (a) may be one for adhering between the separators 30*a* and 30*b*. The adhesive (a) can be applied to one surface of the upper separator 30*b* or the lower separator 30*a* to adhere the upper separator 30*b* and the lower separator 30*a*. The upper separator 30*b* and the lower separator 30*a* are adhered, so that movement of the electrodes 10 and 20 located therebetween is restricted, and the positions of the electrodes 10 and 20 can be fixed. At this time, the adhesive (a) may be applied to a region where the electrodes 10 and 20 are not laminated on one surface of the upper separator 30*b* or the lower separator 30*a*.

The adhesive (a) may be one for adhering between the separators 30*a* and 30*b* and the electrodes 10 and 20. The adhesive (a) can be applied to one surface of the separators 30*a* and 30*b* or the electrodes 10 and 20 to adhere the separators 30*a* and 30*b* and the electrodes 10 and 20 facing each other. For example, the adhesive (a) can be provided between the lower separator 30*a* and the anode 20 to fix the lower separator 30*a* and the anode 20. The adhesive (a) can be provided between the upper separator 30*b* and the cathode 10 to fix the upper separator 30*b* and the cathode 10. At this time, the adhesive (a) can be applied to the electrodes 10 and 20, or can be applied to a region where the electrodes 10 and 20 are laminated on one surface of the upper separator 30*b* or the lower separator 30*a*.

Meanwhile, the adhesive (a) applied onto the electrodes 10 and 20 and the separators 30*a* and 30*b* can be applied so as to form a plurality of rows along a specific direction from a plurality of points which are spaced apart from each other. As a specific example, as shown in FIGS. 4 and 5, the jetting device 70 may include a large number of nipples α, β and γ arranged at intervals, and each of these continuously jets the adhesive (a), so that the applied adhesive (a) can form a plurality of rows.

Here, the adhesives (a) forming a specific row may be applied at a narrower or wider interval than the adhesives (a) forming another row. In addition, the area of the adhesives (a) applied in a particular row may be formed to be larger than the surface of the adhesives (a) applied in another row. For example, an adhesive can be applied at narrower intervals at the contact points between the anode tab 20*a* and the cathode tab 10*a*, which require a larger adhesive force. This may be formed by adjusting the jetting speed, the jetting amount, the jetting area, etc. between the nipples α, β and γ contained in the jetting device 70 of FIG. 5.

Figure 7:
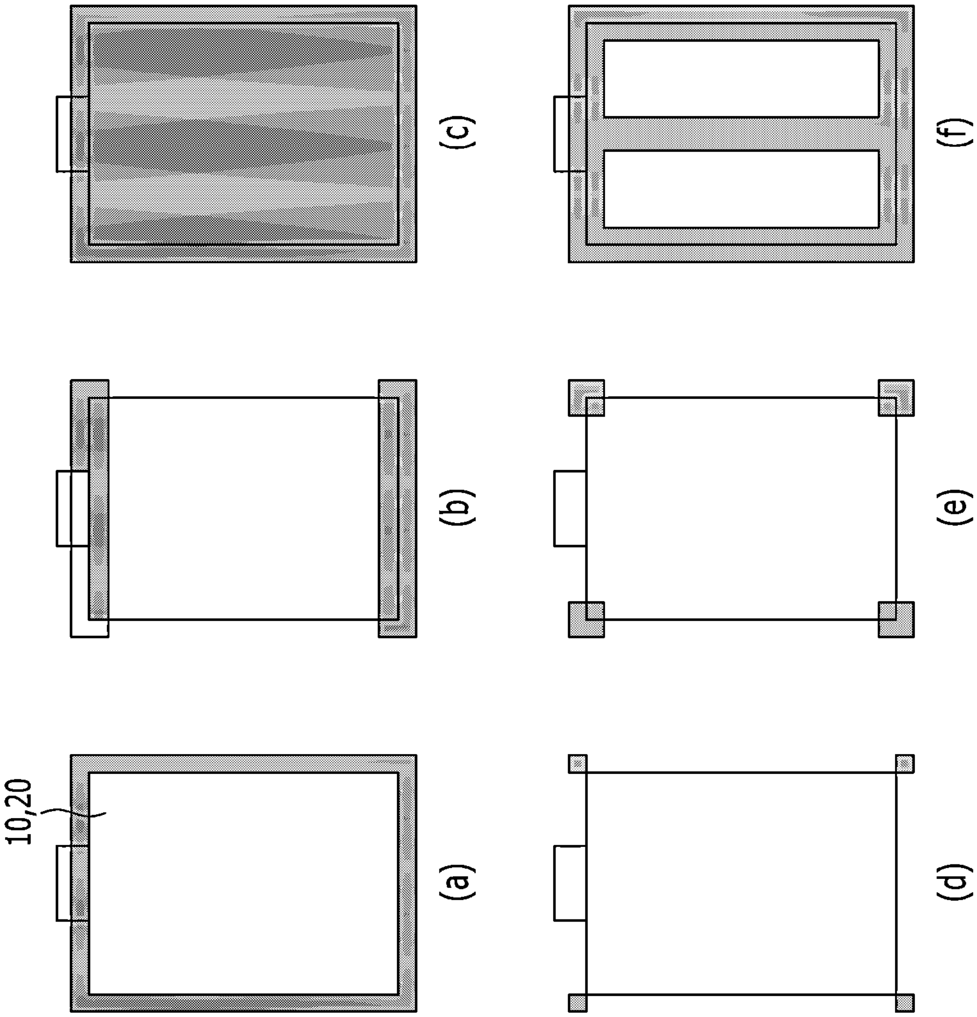
FIG. 7 is a diagram showing a region in which an adhesive is applied in a unit cell containing an adhesive composition according to an embodiment of the present disclosure.

FIG. 7 is a diagram showing a region in which an adhesive is applied in a unit cell containing an adhesive composition according to an embodiment of the present disclosure. The portion indicated by dots in FIG. 7 may indicate a position where the adhesive is applied.

Referring to FIG. 7, the electrodes 10 and 20 can have a rectangular shape having two relatively short sides and two relatively long sides. When the electrodes 10 and 20 are laminated on the separators 30*a* and 30*b*, the electrodes 10 and 20 can be disposed so that their long sides are located side by side in the width direction of the separator.

The adhesive may be provided on the surface in which the two separators 30*a* and 30*b* facing each other come into contact, as shown in FIG. 7(*a*). The adhesive may be provided on the edges of the separators 30*a* and 30*b* on which the electrodes 10 and 20 are not laminated. By adhering between the separators 30*a* and 30*b* through an adhesive, the movement of the electrodes 10 and 20 located between the two separators 30*a* and 30*b* can be restricted.

The adhesive can be provided on a contact surface between the electrodes 10 and 20 and the separators 30*a* and 30*b* as shown in FIG. 7(*b*). The adhesive is provided on the contact surfaces of the electrodes 10 and 20 and the separators 30*a* and 30*b*, so that the relative movement between the electrodes 10 and 20 and the separators 30*a* and 30*b* can be restricted. As a specific example, the adhesive can be provided at a position where both short sides of the electrodes 10 and 20 are placed so that the electrodes 10 and 20 and the separators 30*a* and 30*b* are adhered only on the short sides of the electrodes 10 and 20.

The adhesive can be provided not only on the contact surface between the electrodes 10 and 20 and the separators 30*a* and 30*b* as shown in FIG. 7(*c*), but also on the contact surface between the separators 30*a* and 30*b*. In addition, the adhesive can be provided at positions corresponding to the four vertices of the electrodes 10 and 20, as shown in FIGS. 7(*d*) and 7(*e*), and can be provided in the region corresponding to the short side and the long side of the electrodes 10 and 20 and the central region as shown in FIG. 7(*f*). The application positions of the adhesive shown in FIG. 7 is merely examples, and the positions at which the adhesive or adhesive composition is provided may vary in addition to the drawings described above, and thus, the position of its provision should not be limited by the diagram of FIG. 7.

Figure 8:
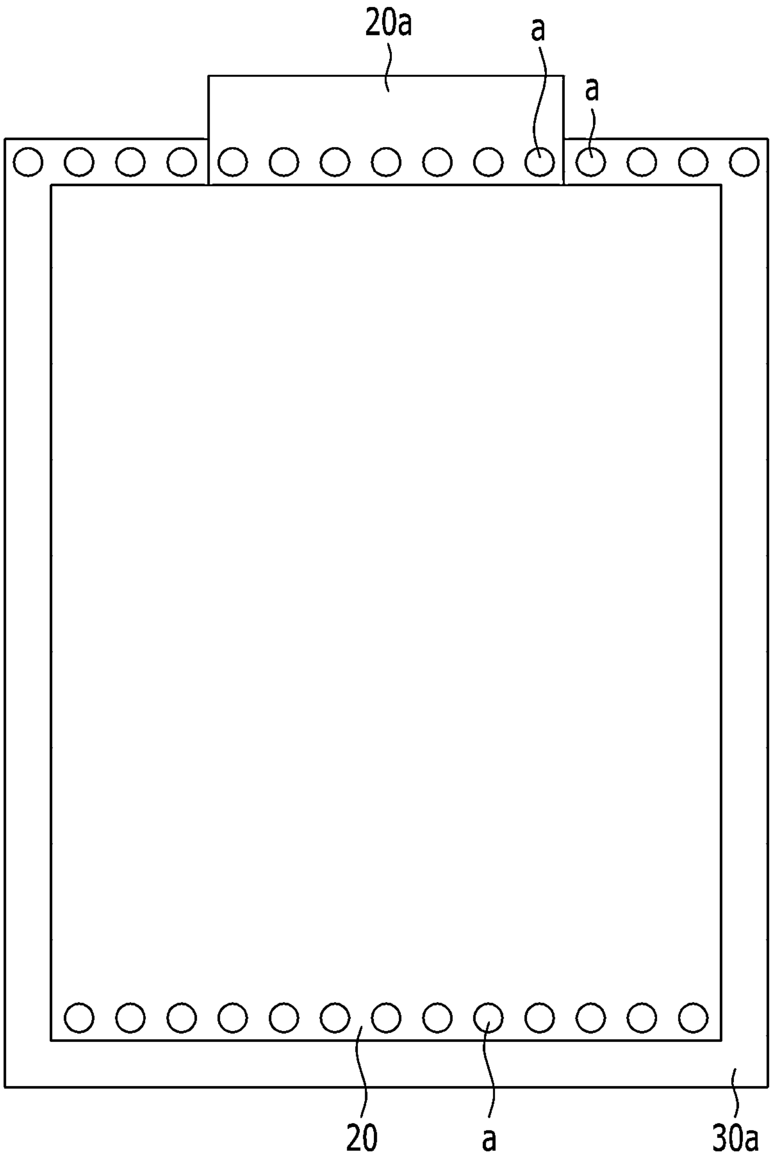
FIGS. 8 to 10 are diagrams illustrating that an adhesive is applied to the electrode or separator of FIG. 5.
Figure 9:
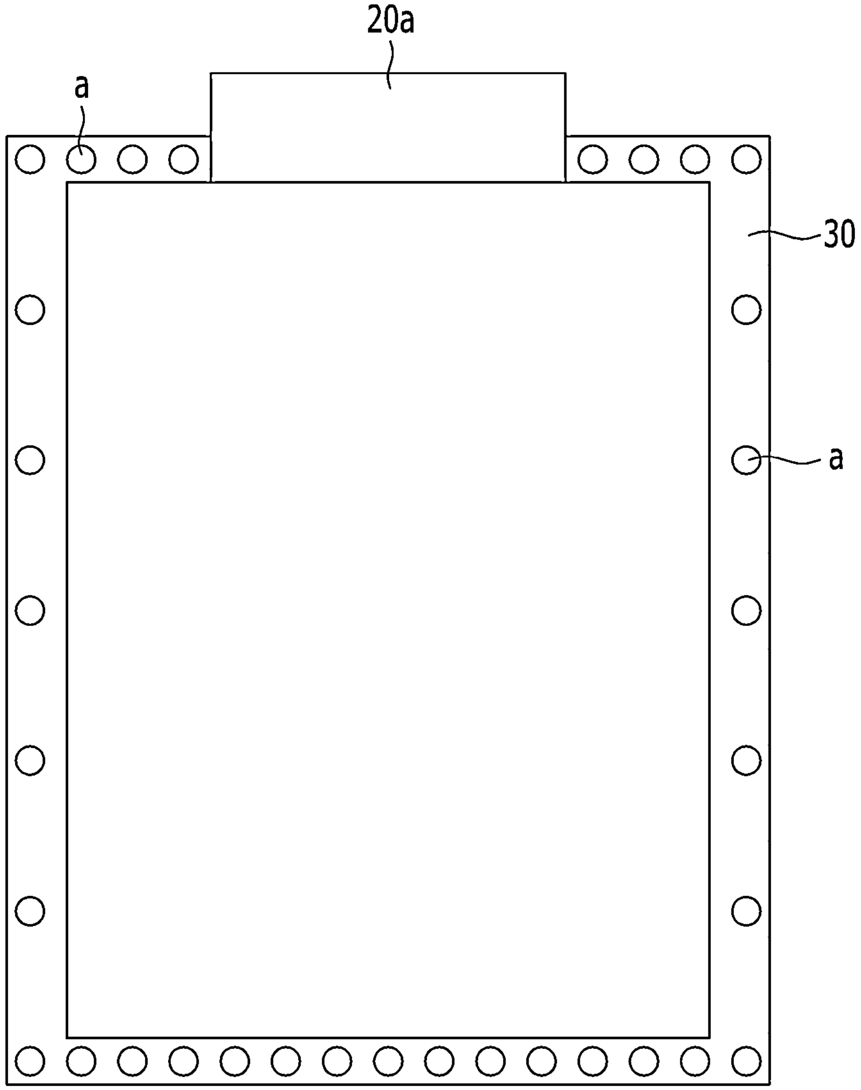
Figure 10:
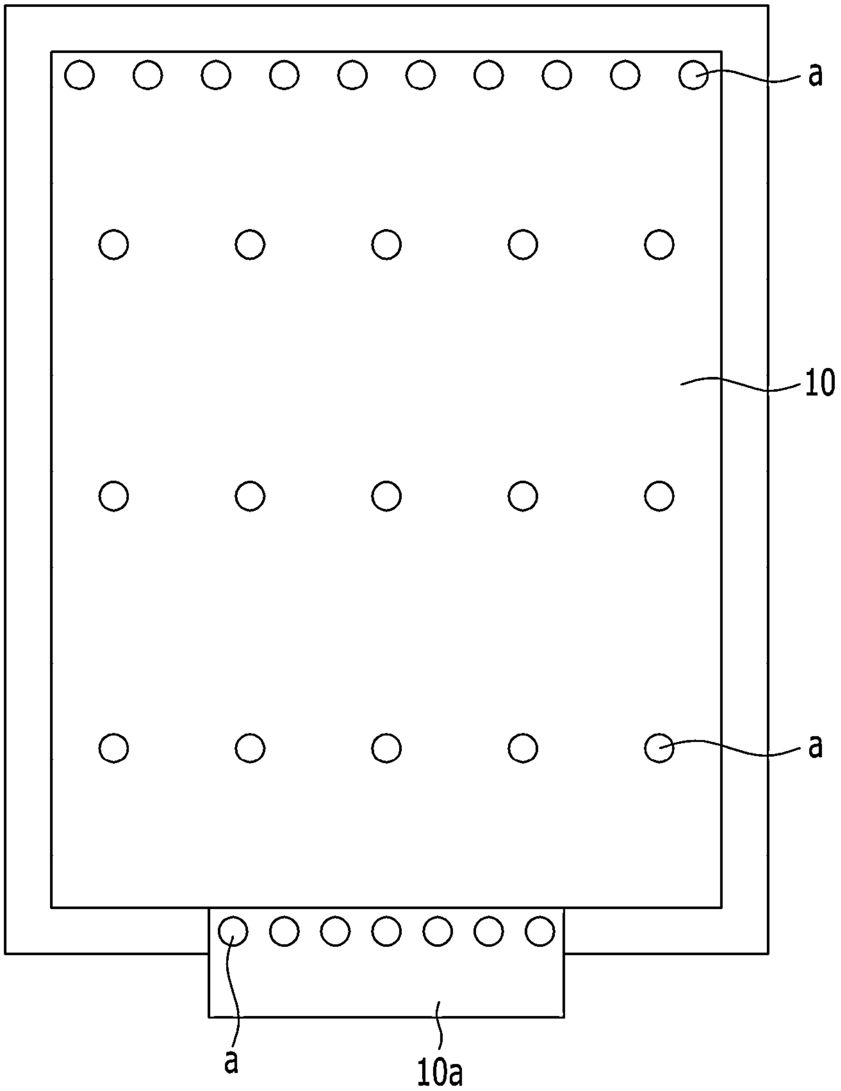

FIGS. 8 to 10 are diagrams illustrating that an adhesive is applied to the electrode or separator of FIG. 6.

FIG. 8 is a diagram showing an application pattern of the adhesive (a) provided between the lower separator 30*a* and the negative electrode 20. The form as shown in FIG. 8 can be an application pattern of the adhesive (a) jetted onto the lower separator 30*a* before the anode 20 is laminated on the lower separator 30*a*. Here, the adhesive (a) may be formed more densely in the portion where the cathode tab 20*a* is located based on both short sides of the anode 20. For example, among the nipples α, β and γ, the nipple β does not apply the adhesive (a), and increases the jetting speed of the nipple α located near the anode tab 20*a* among the nipples α and γ at both ends, thereby forming a pattern of the adhesive (a) as shown in FIG. 8.

FIG. 9 is a diagram showing an application pattern of an adhesive provided between the anode 20 and the upper separator 30*b*, and FIG. 10 is a diagram showing an application pattern of an adhesive provided between the upper separator 30*b* and the cathode 10. The form as shown in FIG. 9 may be an application pattern of the adhesive (a) jetted onto the upper separator 30*b* after the upper separator 30*b* is laminated onto the anode 20, and the form shown in FIG. 10 may be an application pattern of the adhesive (a) jetted onto the upper separator 30*b* before the cathode 10 is laminated with the upper separator 30*b*. Similar to that shown in FIG. 8, the adhesive (a) of FIGS. 9 and 10 may also be more densely applied to the point where the cathode electrode tab 10*a* is positioned.

Hereinafter, a battery cell including the above-mentioned unit cell will be described.

Meanwhile, the unit cell may be sealed inside the cell case and provided as a battery cell. Specifically, the battery cell may include an electrode assembly containing at least one unit cell, an electrode tab extending from one end of an electrode included in the electrode assembly, an electrode lead combined with electrode tabs, and a cell case housing the electrode assembly in a state where one end of the electrode lead is pulled out to the outside.

The electrode assembly may include at least one unit cell. The electrode assembly may have a structure in which at least two unit cells are laminated. The unit cell may be a power generation device capable of charging and discharging. The unit cell can include an electrode and a separator, and the electrode can be provided as a cathode or an anode. A separator may be interposed between electrodes, and the unit cell may have a structure in which a separator/cathode/separator/cathode are alternately laminated. For a more detailed description of the unit cell, refer to the contents described above.

The electrode tab may extend from a large number of electrodes and may be a portion to which an electrode active material is not applied. The electrode tab connected to the cathode may be referred to as a cathode tab, and the electrode tab connected to the anode may be referred to as an anode tab. The electrode tab may extend in one direction or both directions from the end of the cathode or the anode of the unit cell.

The electrode lead may electrically connect the unit cell in the cell case to an external member outside the cell case. One end of the electrode lead can be pulled off to the outside of the cell case, and the other end of the electrode lead can be coupled to the electrode tab in the cell case. A connection between the electrode lead and the electrode tab can be formed through welding.

Figure 11:
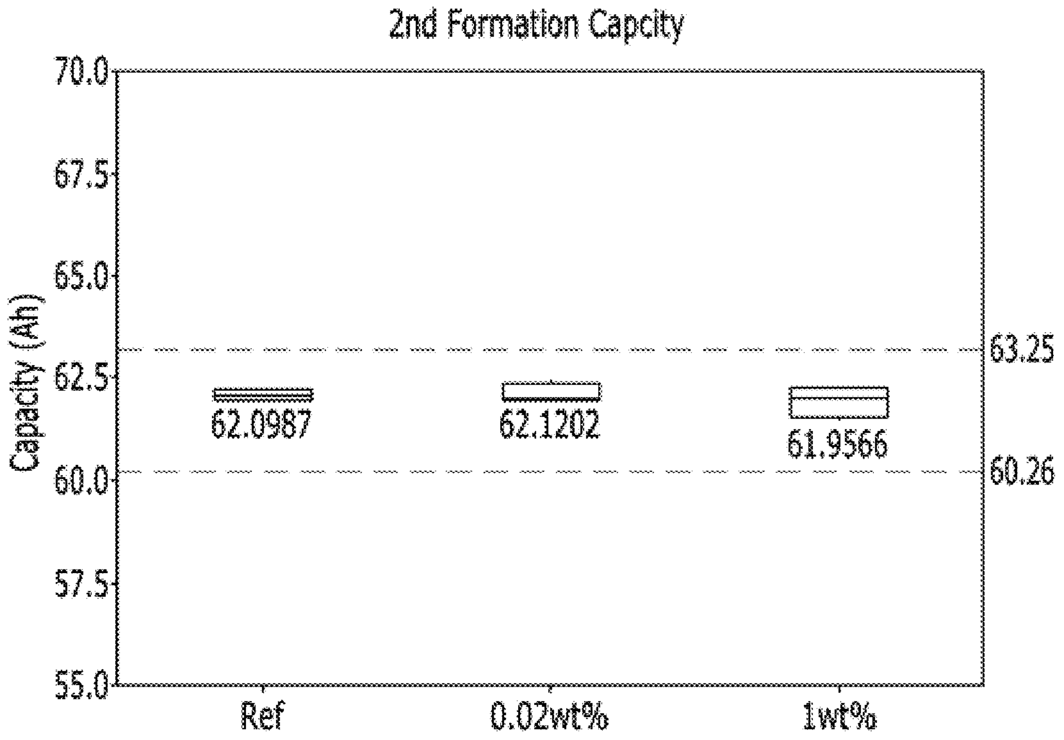
FIG. 11 is a graph showing the capacity measured in a battery cell according to an embodiment of the present disclosure.
Figure 12:
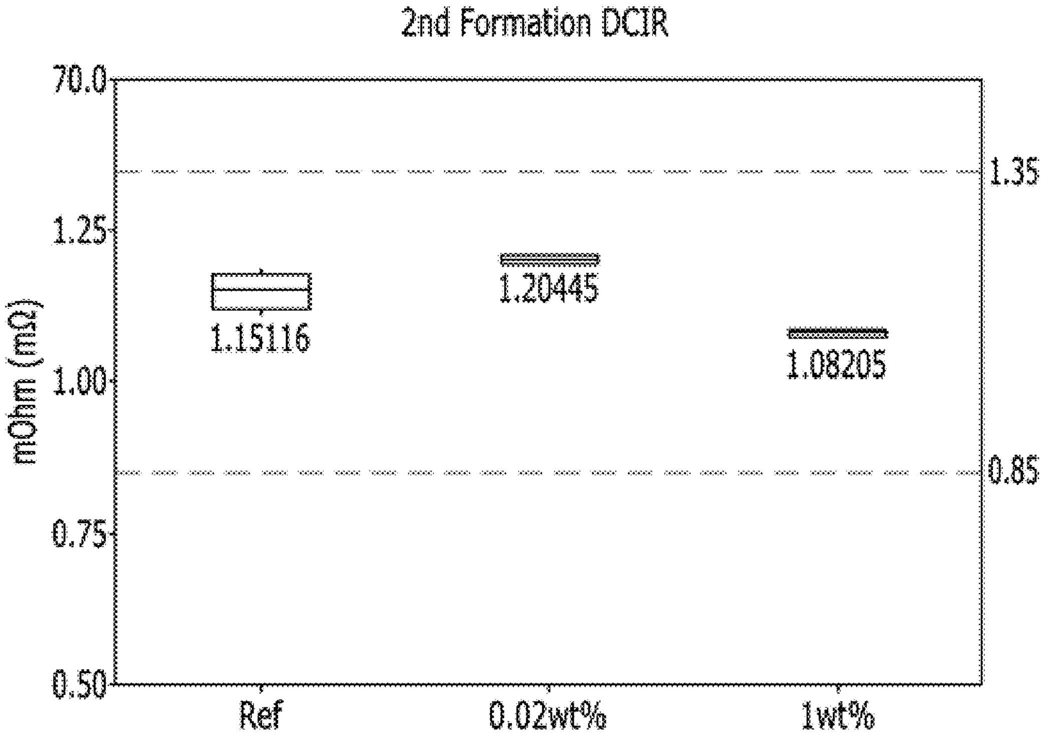
FIG. 12 is a graph showing the resistance value measured in a battery cell according to an embodiment of the present disclosure.
Figure 13:
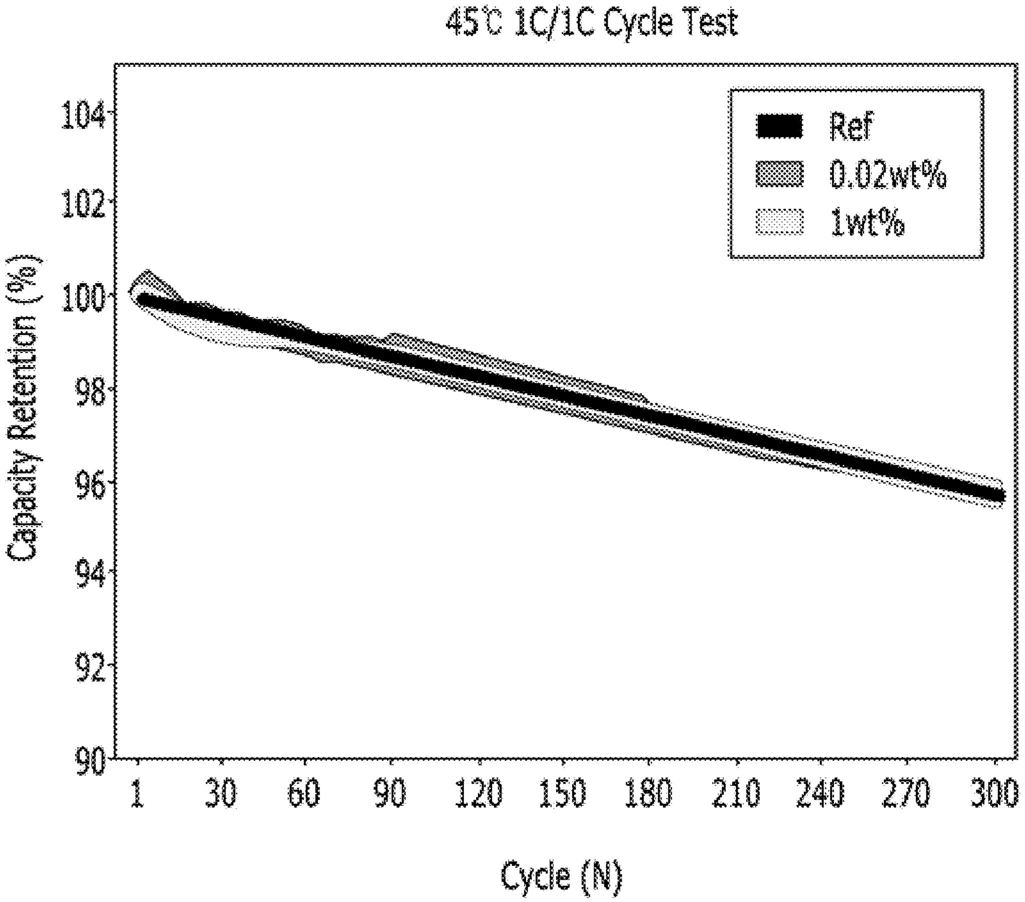
FIG. 13 is a graph showing the capacity retention measured in a battery cell according to an embodiment of the present disclosure.

The cell case can be one for sealing the unit cell located inside by sealing the edge by heat sealing or the like. The cell case may generally have a laminate structure of a resin layer/metal thin film layer/resin layer. In addition, in order to stably maintain the laminated structure of the cell case when the battery cell laminate is formed, the cell case may include adhesive members such as a cohesive adhesive such as double-sided tape provided on the outer surface of the cell case, or a chemical adhesive that is bound by a chemical reaction during bonding FIG. 11 is a graph showing the capacity measured in a battery cell according to an embodiment of the present disclosure. FIG. 12 is a graph showing the resistance value measured in a battery cell according to an embodiment of the present disclosure. FIG. 13 is a graph showing the capacity retention measured in a battery cell according to an embodiment of the present disclosure.

Referring FIGS. 11 and 12, in contrast to the reference example (Reference) in which heat and pressure in a lamination method are applied to an electrode and a separator in order to assemble a unit cell without using an adhesive, according to the present embodiment, when the adhesive compared to the electrolyte is used in amounts of 0.02 wt % and 1 wt %, respectively, it can be confirmed that the Reference and the present embodiment are at the same level with respect to the capacity and resistance of the unit cell. In addition, referring to FIG. 13, it can be confirmed that the capacity retention rate of the unit cell is also at an equivalent level compared to the conventional method through the charge/discharge test.

The separator according to the embodiment described herein may be a Ceramic Coated Separator (CCS). In general, the separator has a raw film and a coating layer formed on at least one surface of the raw film, and the coating layer may include alumina powder and a binder to aggregate them. In Safety Reinforced Separator (SRS), a large amount of binder is coated on the surface of the coating layer, but in CCS, the binder is not coated on the surface of the coating layer, or the binder content distributed on the surface may be very low compared to SRS. For example, in the case of the CCS separator according to the present embodiment, the content of the binder coated on the surface of the coating layer of the separator may be about 3 wt % or less.

When the separator is CCS, since the internal electrodes included in the electrode assembly are transported in an unfixed state, alignment may be disturbed during transport. Of course, when the separator is CCS, it may be fixed by heat and pressure, but the alignment of the internal electrodes may be disturbed even in the process of transferring the electrode and the separator to the fixing device for heat and pressure after forming the laminate of the electrode and the separator. In addition, there is a disadvantage in that an expensive separator having a high binder content must be used to attach the electrode and the separator by heat and pressure. On the other hand, according to the present embodiment, it is possible to increase the fixing force while preventing the alignment of the internal electrodes from being disturbed during transport.

Figure 14:
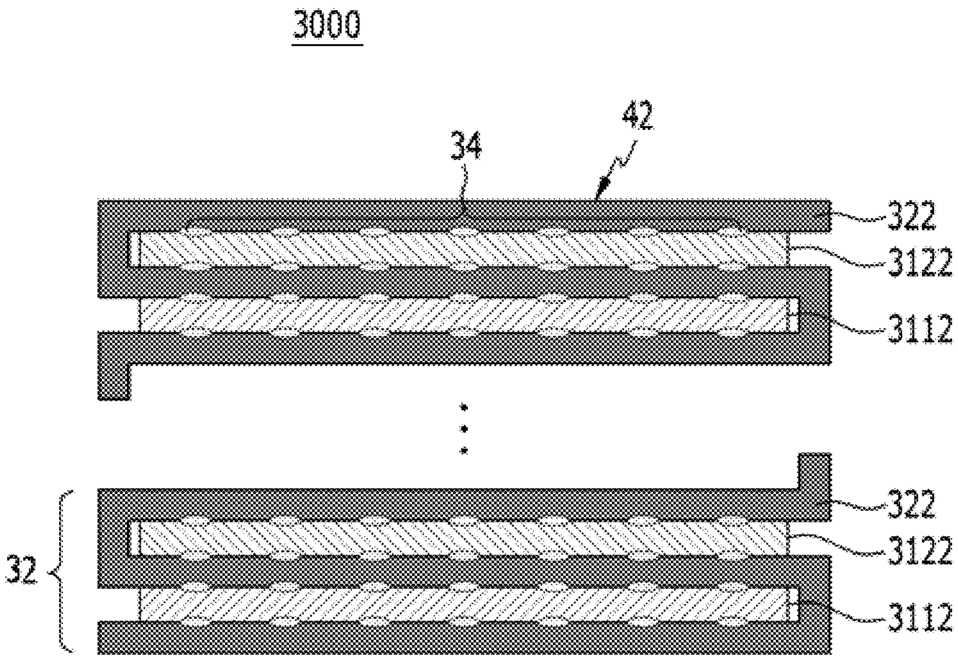
FIG. 14 is a cross-sectional view showing an electrode assembly according to an embodiment of the present disclosure.

FIG. 14 is a cross-sectional view showing an electrode assembly according to an embodiment of the present disclosure.

Referring to FIG. 14, the electrode assembly 3000 according to the present embodiment may include an electrode stack 42 manufactured by repeatedly forming the basic unit 32 a plurality of times. Here, the basic unit 32 may be a unit in which the separator 322 is folded to have a zigzag shape, covers the electrode 3122, and the electrode 3112 and the separator 322 are stacked. That is, in the basic unit 32, one side and the other side of the separator 322 are sequentially folded to cover the electrode 3122, and the electrode 3112 and the separator 322 may be sequentially stacked.

A fixing tape may be attached to the electrode assembly 3000, but one end of the separator 322 may cover a portion of the outer surface of the electrode stack 42 instead of the fixing tape. The basic unit 32 of the present embodiment may be in a state in which the electrodes 3112 and 3122 and the separator 322 are adhered to each other with an adhesive 34. A portion where the electrodes 3112 and 3122 and the separator 322 are bonded by the adhesive 34 may be the first adhesive part. Accordingly, the alignment between the electrodes 3112 and 3122 and the separator 322 may be maintained by the adhesive force of the adhesive 34.

In the electrode stack 42 of this embodiment, the separator 322 covers the upper and lower portions and one side of the electrodes 3112 and 3122, so that the stacking alignment of the basic units 32 can be maintained without the fixing tape. In addition, when the fixing tape is attached to the outside of the electrode stacked body 42 of this embodiment or one end of the separator 322 is wrapped around it, the stacking alignment of the basic units 32 is more stably maintained.

Also, in the electrode assembly 3000 manufactured in this embodiment, the adhesive 34 may be disposed at the same position between the electrodes 3112 and 3122 and the separator 322. For example, as shown in FIG. 14, in the electrode assembly 3000 of this embodiment, the adhesive 34 positioned between the lower portion of the first electrode 3112 and the separator 322 and the adhesive 34 between the upper portion of the first electrode 3112 and the separator 322 may be disposed on the same vertical line with respect to the bottom surface of the first electrode 3112 or the separator 322, respectively, and the gap at which the adhesive 34 is disposed may be equal to each other. This may be similarly explained in the case of the adhesive 34 positioned between the second electrode 3122 and the separator 322.

Accordingly, in the electrode assembly 3000 manufactured in this embodiment, the adhesive 34 is disposed at the same position between the electrodes 3112 and 3122 and the separator 322, so that there is an advantage in that the process time and efficiency can be increased.

Figure 15:
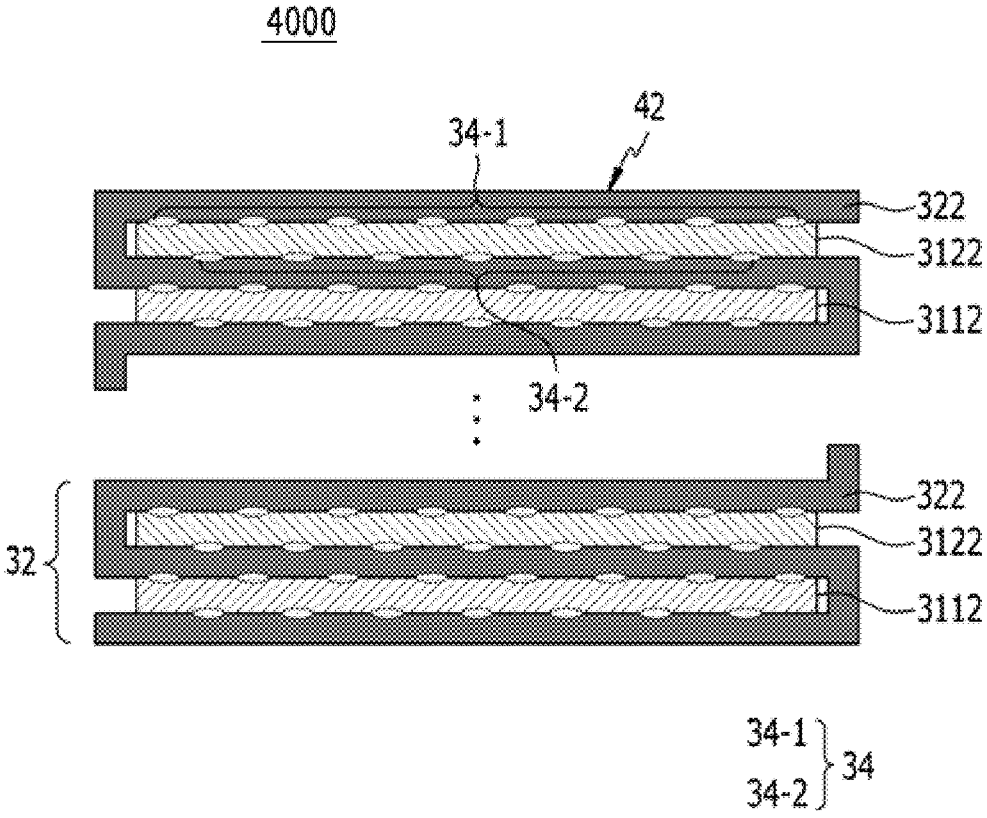
FIG. 15 is a cross-sectional view showing an electrode assembly according to another embodiment of the present disclosure.

FIG. 15 is a cross-sectional view showing an electrode assembly according to another embodiment of the present disclosure.

Referring to FIG. 15, in the electrode assembly 4000 according to the present embodiment, the adhesive 34 is disposed between the electrodes 3112 and 3122 and the separator 322, and the adhesive 34 disposed in adjacent layers may be arranged in a staggered form. For example, as shown in FIG. 15, in the electrode assembly 4000 of this embodiment, the first adhesive 34-1 positioned between the lower portion of the first electrode 3112 and the separator 322 and the second adhesive 34-2 positioned between the upper portion of the first electrode 3112 and the separator 322 may be disposed to be shifted from each other. In this case, the first adhesive 34-1 and the second adhesive 34-2 may be disposed to be shifted from each other, and may be applied at the same distance. This may be similarly explained in the case of the adhesive 14 positioned between the second electrode 3122 and the separator 322.

However, the present invention is not limited thereto, and the structure in which the first adhesive 34-1 and the second adhesive 34-2 are displaced from each other may be manufactured by applying various methods.

Accordingly, in the electrode assembly 4000 of this embodiment, the adhesive 34 is disposed between the electrodes 3112 and 3122 and the separator 322, and the adhesive 34 disposed in adjacent layers is staggered. Thus, it is possible to minimize an increase in the thickness of the electrode assembly 4000 due to the adhesive 34. In addition, since the adhesives 34 disposed in adjacent layers are displaced from each other, the adhesive 34 may be more easily dissolved in the electrolyte included in the battery cell described above.

Although the invention has been shown and described with reference to the preferred embodiments, it is to be understood that the invention is not limited to the disclosed embodiments, but, on the contrary, is intended to cover various modifications and equivalent arrangements included within the spirit and scope of the appended claims.

The invention claimed is:

1. A unit cell in which a separator and an electrode are alternately laminated by a predetermined number, the unit cell being configured such that:

the unit cell is laminated in the order of a lower separator, a first electrode, an upper separator, and a second electrode, at least one surface of the first or second electrode or the lower or upper separator is applied with an adhesive to adhere the first or second electrode and the lower or upper separator or the lower separator and the upper separator, the adhesive comprises an adhesive composition comprising a copolymer and a rosin ester-based additive, the copolymer contains 60.1 to 79.9% by weight of two or more kinds of alkyl (meth)acrylate-based repeating units (A), and 20.1 to 39.9% by weight of (meth) acrylate-based repeating unit (B) having a hydroxyl group at its end, and the adhesive composition contains 30% by weight to 70% by weight of the copolymer and 30% by weight to 70% by weight of the additive, wherein:

at least one of the two or more kinds of repeating units (A) includes an acrylate-based repeating unit, and at least the other one is a methacrylate-based repeating unit, and an alkyl group having a greater number of carbon atoms than the end of the methacrylate-based repeating unit is bonded to the end of the acrylate-based repeating unit.

2. The unit cell of claim 1, wherein:

the at least one surface to which the adhesive is applied is an application surface of the upper separator or the lower separator to adhere the upper separator and the lower separator.

3. The unit cell of claim 1, wherein:
the at least one surface to which the adhesive is applied is an application surface of the lower or upper separator or the first or second electrode to adhere the lower or upper separator and the first or second electrode facing each other at the application surface.
4. The unit cell of claim 1, wherein:
at least one of the repeating units (A) is represented by the following Chemical Formula 1, and the repeating unit (B) is represented by the following Chemical Formula 2.

[Chemical Formula 1]

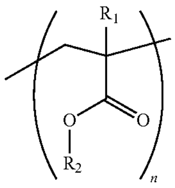

wherein in Chemical Formula 1, $R_1$ is a hydrogen atom or a methyl group, $R_2$ is a straight-chain or side-chain alkyl group having 1 to 12 carbon atoms, and n indicates the number of repetitions of the repeating unit (A) and is an integer of 450 to 850,

[Chemical Formula 2]

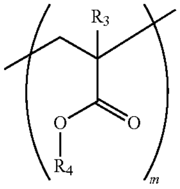

wherein in Chemical Formula 2, $R_3$ is a hydrogen atom or a methyl group, $R_4$ is a straight-chain or side-chain alkyl group having 1 to 9 carbon atoms to which a hydroxyl group is bonded, and m indicates the number of repetitions of the repeating unit (B) and is an integer of 200 to 350.
5. The unit cell of claim 1, wherein:
a weight average molecular weight (Mw) of the copolymer is 120000 to 140000.
6. The unit cell of claim 1, wherein:
a straight-chain or side-chain alkyl group having 4 to 12 carbon atoms is bonded to the end of the acrylate-based repeating unit, and
an alkyl group having 1 to 3 carbon atoms is bonded to the end of the methacrylate-based repeating unit.
7. The unit cell of claim 1, wherein:
both of the two or more kinds of repeating units (A) are acrylate-based repeating units, and
at least one of the two or more kinds of repeating units (A) is an isobornyl acrylate-based repeating unit.
8. The unit cell of claim 1, wherein:
the two or more kinds of repeating units (A) comprises a methyl methacrylate-based repeating unit and a 2-ethylhexyl acrylate (2-EHA)-based repeating unit.
9. The unit cell of claim 1, wherein:
the repeating unit (B) comprises a 2-hydroxyethyl acrylate (2-HEA)-based repeating unit.
10. The unit cell of claim 1, wherein:
a glass transition temperature (Tg)(° C) of the additive is −10 less.
11. The unit cell of claim 1, wherein:
HSP (Hilderbrand solubility) of the additive has a value of 19 to 22 $(MPa)^{0.5}$.
12. The unit cell of claim 1, wherein:
the adhesive composition contains 30% by weight to 50% by weight of the copolymer and 50% by weight to 70% by weight of the additive.
13. The unit cell of claim 1, wherein:
a glass transition temperature (Tg)(° C) of the adhesive composition is −40 or less.
14. The unit cell of claim 1, wherein:
a glass transition temperature (Tg)(° C) of the adhesive composition is −50 or less.
15. The unit cell of claim 1, wherein:
the adhesive composition has a viscosity of 2200 cPs to 2500 cPs at 80° C.
16. The unit cell of claim 1, wherein:
the adhesive composition has a viscosity of 2200 cPs to 2400 cPs at 80° C.
17. The unit cell of claim 1, wherein:
when dots formed by discharging the adhesive composition from a dispenser at a first time point have a first diameter value, and dots formed by discharging the adhesive composition from the dispenser at a second time point which is 30 minutes or more after the first time point have a second diameter value,
a deviation between the first diameter and the second diameter is within 5%, and
a temperature of the dispenser is 120° C.
18. The unit cell of claim 1, wherein:
an adhesive force of the adhesive composition is 40 $gf/mm^2$ or more.
19. The unit cell of claim 1, wherein:
an adhesive force of the adhesive composition is 85 to 92 $gf/mm^2$.
20. An electrode assembly formed by alternately stacking the unit cell of claim 1, the electrode assembly being configured such that:
the adhesive for adhering the first electrode and the lower separator includes a first adhesive pattern disposed at the same position as a second adhesive pattern of the adhesive between the first electrode and the upper separator.
21. An electrode assembly formed by alternately stacking the unit cell of claim 1, the electrode assembly being configured such that:
the adhesive for adhering the first electrode and the lower separator includes a first adhesive pattern disposed at a staggered form with respect to a second adhesive pattern of the adhesive between the first electrode and the upper separator.
22. A battery cell comprising the unit cell of claim 1.
23. The battery cell of claim 22, wherein:
the lower separator and the upper separator are portions of an elongated separator folded to have a zigzag shape.

* * * * *